US008948154B2

(12) United States Patent
Gaal et al.

(10) Patent No.: US 8,948,154 B2
(45) Date of Patent: Feb. 3, 2015

(54) METHOD AND APPARATUS FOR SENDING AND RECEIVING A LOW-COMPLEXITY TRANSMISSION IN A WIRELESS COMMUNICATION SYSTEM

(75) Inventors: Peter Gaal, San Diego, CA (US); Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1033 days.

(21) Appl. No.: 13/022,328

(22) Filed: Feb. 7, 2011

(65) Prior Publication Data

US 2011/0194510 A1     Aug. 11, 2011

Related U.S. Application Data

(60) Provisional application No. 61/303,194, filed on Feb. 10, 2010.

(51) Int. Cl.
*H04B 7/208* (2006.01)
*H04J 1/00* (2006.01)
(Continued)

(52) U.S. Cl.
CPC .......... *H04L 5/0037* (2013.01); *H04L 27/0008* (2013.01); *H04L 27/361* (2013.01); *H04L 5/0007* (2013.01); *H04L 5/023* (2013.01); *H04L 27/2636* (2013.01)
USPC ............. 370/344; 370/343; 370/436; 455/23; 455/45; 455/60; 455/61

(58) Field of Classification Search
CPC ..... H04L 5/0007; H04L 5/0037; H04L 5/023; H04L 27/0008; H04L 27/361; H04L 27/2636
USPC ........... 370/343, 344, 436; 455/23, 45, 60, 61
See application file for complete search history.

(56) References Cited

U.S. PATENT DOCUMENTS 4,786,882 A     11/1988 Koike
7,505,543 B2*    3/2009 Paille ............................ 375/376
(Continued)

FOREIGN PATENT DOCUMENTS

JP    H0475437 A     3/1992
JP    H0685535 A     3/1994
(Continued)

OTHER PUBLICATIONS

Alcatel-Lucent: "M2M Communication", 3GPP TSG-RAN-WG1 Meeting #54bis Prague, R1-083850, Oct. 3, 2008.
(Continued)

*Primary Examiner* — Asad Nawaz
*Assistant Examiner* — Kai Chang
(74) *Attorney, Agent, or Firm* — Paul Kuo

(57) ABSTRACT

Techniques for supporting data transmission based on a low-complexity transmission scheme are described. In one design, a first user equipment (UE) generates a first transmission for a single subcarrier assigned to the first UE. The first UE sends the first transmission on the single subcarrier concurrently with a SC-FDMA transmission sent on multiple subcarriers by a second UE. In one design, the first UE generates a continuous sinusoidal signal at a frequency corresponding to the single subcarrier. The first UE modulates the continuous sinusoidal signal with data symbols and reference symbols. In one design, the first transmission includes a cyclic prefix followed by a useful portion in each symbol period and has phase discontinuity at symbol boundary. A base station processes a received signal to recover the first transmission sent by the first UE and the SC-FDMA transmission sent by the second UE.

37 Claims, 12 Drawing Sheets

(51) Int. Cl.

| | |
|---|---|
| *H04B 7/165* | (2006.01) |
| *H04B 1/00* | (2006.01) |
| *H04L 5/00* | (2006.01) |
| *H04L 27/00* | (2006.01) |
| *H04L 27/36* | (2006.01) |
| H04L 5/02 | (2006.01) |
| H04L 27/26 | (2006.01) |

(56) References Cited

U.S. PATENT DOCUMENTS

| | | | |
|---|---|---|---|
| 7,616,556 B2 * | 11/2009 | Nystrom et al. | 370/208 |
| 7,701,839 B2 * | 4/2010 | Nangia et al. | 370/208 |
| 8,072,941 B2 * | 12/2011 | Wolf et al. | 370/334 |
| 8,457,055 B2 * | 6/2013 | Kawamura et al. | 370/329 |
| 8,649,364 B2 * | 2/2014 | Myung | 370/344 |
| 2002/0114270 A1 | 8/2002 | Pierzga et al. | |
| 2004/0218521 A1 * | 11/2004 | Bolinth et al. | 370/206 |
| 2005/0113045 A1 * | 5/2005 | Santhoff et al. | 455/130 |
| 2006/0291470 A1 * | 12/2006 | Khandekar et al. | 370/395.1 |
| 2007/0004465 A1 * | 1/2007 | Papasakellariou et al. | 455/571 |
| 2007/0014272 A1 * | 1/2007 | Palanki et al. | 370/344 |
| 2007/0183384 A1 * | 8/2007 | Kwak et al. | 370/338 |
| 2008/0056305 A1 * | 3/2008 | Medvedev et al. | 370/491 |
| 2008/0267157 A1 * | 10/2008 | Lee et al. | 370/342 |
| 2009/0022135 A1 * | 1/2009 | Papasakellariou et al. | 370/344 |
| 2009/0074106 A1 * | 3/2009 | See et al. | 375/297 |
| 2009/0147669 A1 * | 6/2009 | Green | 370/215 |
| 2009/0180459 A1 * | 7/2009 | Orlik et al. | 370/344 |
| 2009/0257398 A1 * | 10/2009 | Koyanagi et al. | 370/331 |
| 2010/0034163 A1 | 2/2010 | Damnjanovic et al. | |
| 2010/0091755 A1 * | 4/2010 | Kwon et al. | 370/344 |
| 2010/0135273 A1 * | 6/2010 | Kim | 370/344 |
| 2010/0246377 A1 * | 9/2010 | Zhang et al. | 370/210 |
| 2010/0303039 A1 * | 12/2010 | Zhang et al. | 370/331 |
| 2010/0329389 A1 * | 12/2010 | Ishihara et al. | 375/316 |
| 2011/0075651 A1 * | 3/2011 | Jia et al. | 370/344 |
| 2011/0149781 A1 * | 6/2011 | Zhou et al. | 370/252 |
| 2011/0176498 A1 * | 7/2011 | Montojo et al. | 370/329 |
| 2011/0205973 A1 * | 8/2011 | Ogawa et al. | 370/328 |
| 2012/0140760 A1 * | 6/2012 | Schmidt | 370/344 |

FOREIGN PATENT DOCUMENTS

| | | |
|---|---|---|
| JP | 10150429 A | 6/1998 |
| JP | 2001521327 A | 11/2001 |
| JP | 2011530966 | 12/2011 |
| JP | 2013502124 A | 1/2013 |
| WO | 9921315 A1 | 4/1999 |
| WO | 2008120925 A1 | 10/2008 |
| WO | 2008133981 A1 | 11/2008 |
| WO | 2008137963 A2 | 11/2008 |
| WO | WO 2009064531 | 5/2009 |
| WO | 2011018419 A1 | 2/2011 |

OTHER PUBLICATIONS

Chen Y., et al., "Machine-to-Machine communication in LTE-A", Vehicular Technology Conference Fall, 2010 IEEE 72nd, Sep. 9, 2010, 4 pp.

ETRI: "Consideration on MTC Device type classification", 3GPP TSG-RAN2#68bis meeting Valencia, R2-100275, Jan. 22, 2010.

Nomura Y., et al., "Examination of Voice Delivery System in Mesh Type Network Using ZigBee", Technical Report of IEICE, Feb. 22, 2006, vol. 105, No. 620, pp. 37-42, WBS2005-71.

Nomura Y., et al., "Interference Characteristics of ZigBee by Wireless LAN", Proceedings of the 2004 IEICE General Conference, Mar. 8, 2004, Communication 1, p. 658, B-5-171.

Samsung: "RAN enhancements for Machine-type Communication", 3GPP TSG RAN WG2 #68 bis Valencia, R2-100537, Jan. 22, 2010.

International Search Report and Written Opinion—PCT/US2011/024410, ISA/EPO—May 18, 2011.

* cited by examiner

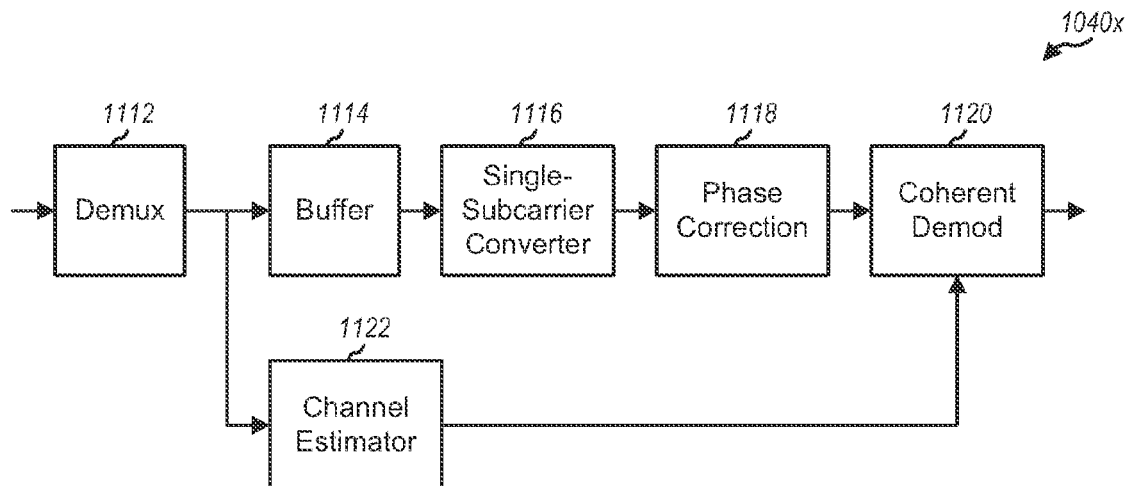
FIG. 11
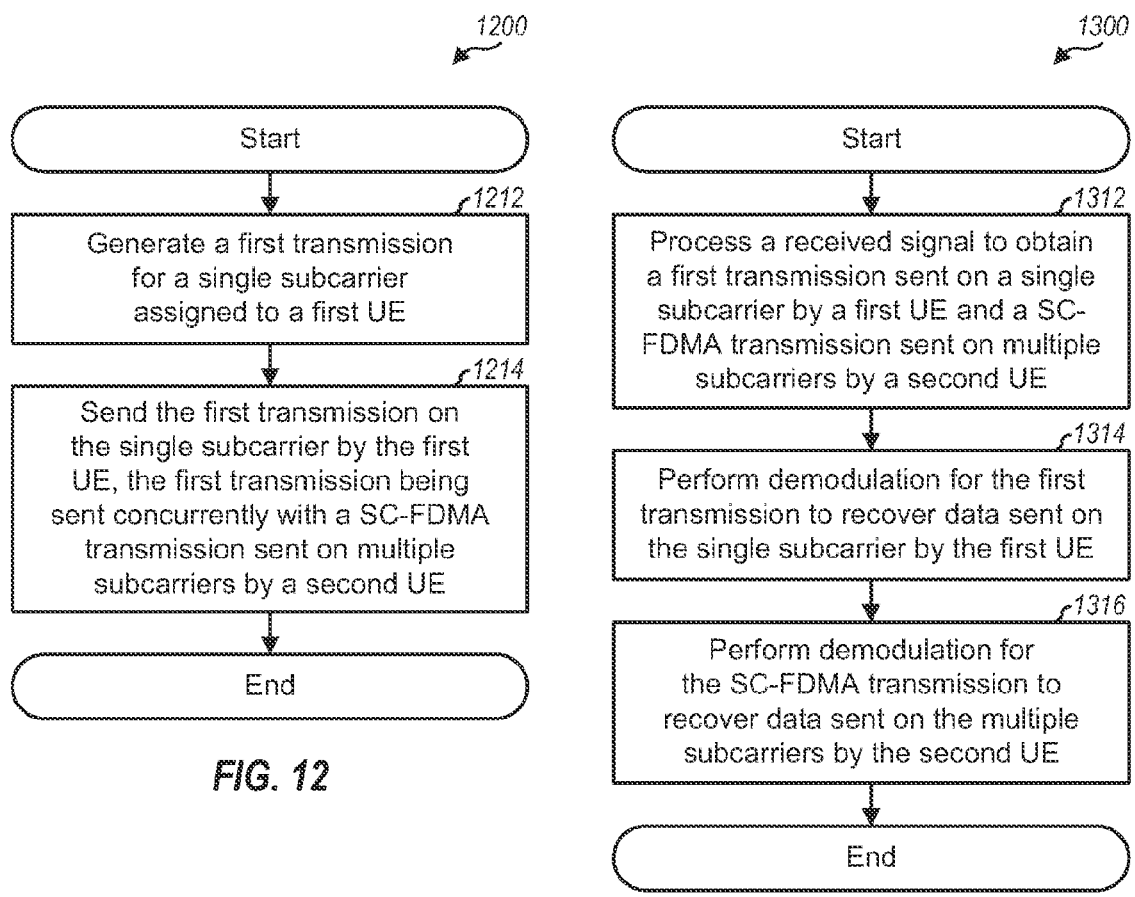
FIG. 12
FIG. 13

METHOD AND APPARATUS FOR SENDING AND RECEIVING A LOW-COMPLEXITY TRANSMISSION IN A WIRELESS COMMUNICATION SYSTEM

The present application claims priority to provisional U.S. Application Ser. No. 61/303,194, entitled "METHOD AND APPARATUS FOR LOW-COMPLEXITY TRANSMISSION WAVEFORMS IN A WIRELESS COMMUNICATION SYSTEM," filed Feb. 10, 2010, assigned to the assignee hereof and incorporated herein by reference in its entirety.

BACKGROUND

I. Field

The present disclosure relates generally to communication, and more specifically to techniques for supporting communication in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include code division multiple access (CDMA) systems, time division multiple access (TDMA) systems, frequency division multiple access (FDMA) systems, orthogonal FDMA (OFDMA) systems, and single-carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. It may be desirable to efficiently support communication for the UEs.

SUMMARY

Techniques for supporting data transmission by UEs are described herein. In an aspect, a low-complexity transmission scheme may be used to allow a UE to transmit on a single subcarrier (or a small number of subcarriers) so as to enable the UE to avoid a complex modulator and to operate with a much simpler transmitter.

In one design, a first UE may generate a first transmission for a single subcarrier assigned to the first UE. The first UE may send the first transmission on the single subcarrier concurrently with a SC-FDMA transmission sent on multiple subcarriers by a second UE. In one design, the first UE may generate a continuous sinusoidal signal at a frequency corresponding to the single subcarrier assigned to the first UE. The first UE may then modulate the continuous sinusoidal signal with at least one modulation symbol for data and at least one reference symbol. In one design, the first transmission may comprise a cyclic prefix followed by a useful portion in each symbol period and may have phase discontinuity at symbol boundary when the cyclic prefix is removed. The useful portions in consecutive symbol periods may have different starting phases.

In one design, a base station may process a received signal to obtain the first transmission sent on a single subcarrier by the first UE and the SC-FDMA transmission sent on multiple subcarriers by the second UE. The base station may perform demodulation for the first transmission to recover data sent on the single subcarrier by the first UE. In one design, the base station may perform phase correction for the first transmission to account for phase discontinuity at symbol boundary. The base station may also perform demodulation for the SC-FDMA transmission to recover data sent on the multiple subcarriers by the second UE.

Various aspects and features of the disclosure are described in further detail below.

BRIEF DESCRIPTION OF THE DRAWINGS

FIG. 11 shows a single-subcarrier demodulator.
FIG. 12 shows a process for transmitting data.
FIG. 13 shows a process for receiving data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below. It should be noted that the invention is not so limited.

Figure 1:
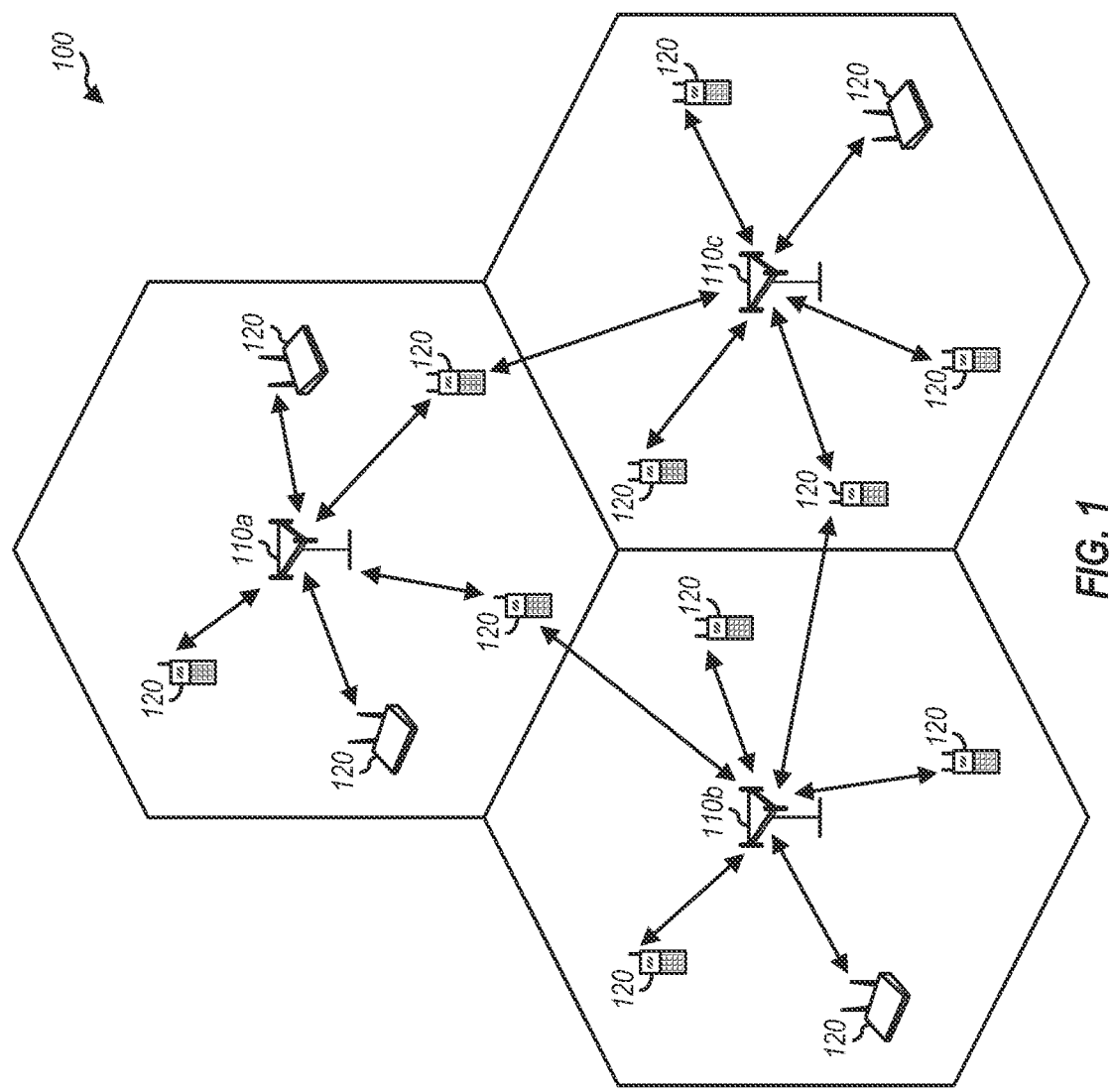
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs 120 and may also be referred to as a base station, a Node B, an access point, etc. Each eNB 110 may provide communication coverage for a particular geographic area and may support communication for the UEs 120 located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE 120 may be stationary or mobile. A UE 120 may also be referred to as a mobile station, a terminal, an access terminal, a subscriber unit, a station, a device, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a sensor, a meter, a server, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 2:
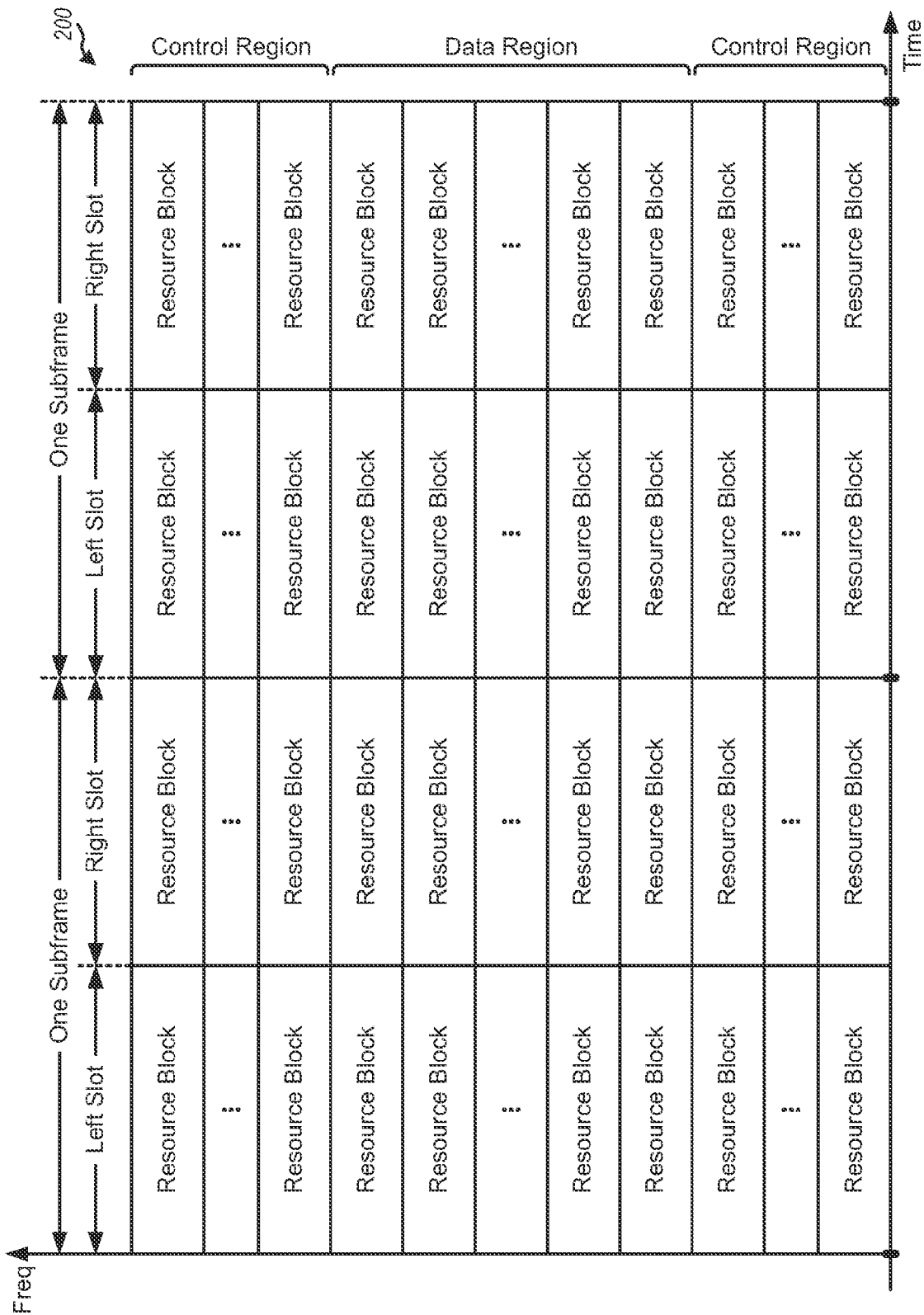
FIG. 2 shows an exemplary transmission structure.

FIG. 2 shows a transmission structure 200 used for each of the downlink and uplink in LTE. The transmission timeline may be partitioned into units of subframes. Each subframe may have a predetermined duration, e.g., one millisecond (ms), and may be partitioned into two slots. Each slot may cover L symbol periods, e.g., six symbol periods for an extended cyclic prefix or seven symbol periods for a normal cyclic prefix.

For each of the downlink and uplink, M resource blocks may be defined in each slot, where M may be dependent on the system bandwidth and may range from 6 to 110 for system bandwidth of 1.25 to 20 MHz, respectively. Each resource block may cover 12 subcarriers in one slot and may include a number of resource elements. Each resource element may cover one subcarrier in one symbol period and may be used to transmit one modulation symbol, which may be a real or complex value. The available resource blocks for each link may be assigned to UEs for transmission of data and control information on that link.

For the uplink, the available resource blocks may be partitioned into a data region and a control region. The control region may include resource blocks near the two edges of the system bandwidth, as shown in FIG. 2. The control region may have a configurable size, which may be selected based on the expected amount of control information being sent on the uplink by the UEs. The data region may include all resource blocks not included in the control region. The design in FIG. 2 results in the data region including contiguous resource blocks, which may allow a single UE to be assigned all of the contiguous resource blocks in the data region.

A given UE may be assigned resource blocks in the control region to transmit control information to an eNB. The UE may also be assigned resource blocks in the data region to transmit data to the eNB. The assigned resource blocks may be paired, and an uplink transmission from the UE may span both slots in a subframe. The two resource blocks in a given pair may occupy the same set of subcarriers if frequency hopping is not enabled or different sets of subcarriers if frequency hopping is enabled.

Figure 3:
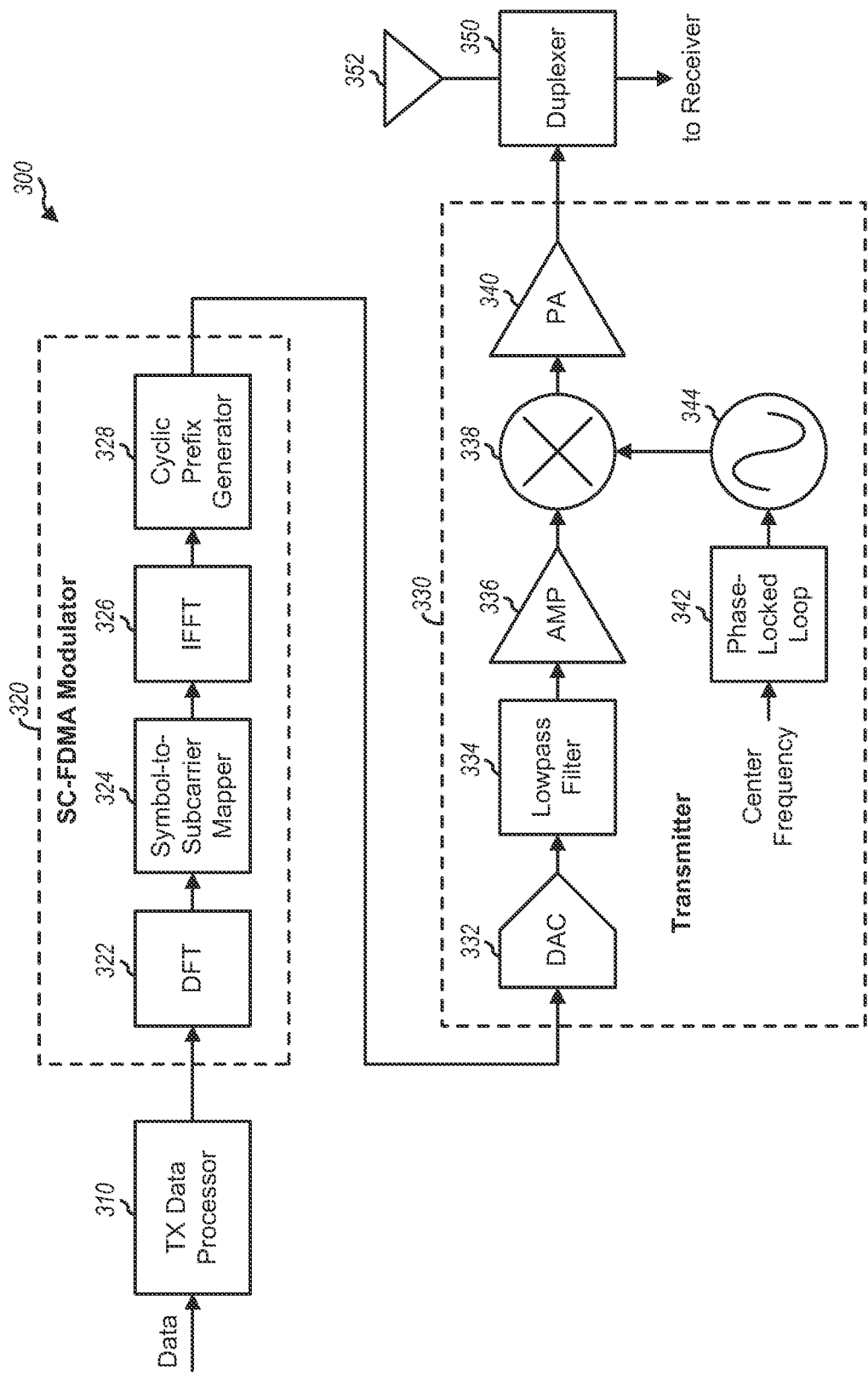
FIG. 3 shows a transmitter subsystem for a SC-FDMA transmission.

FIG. 3 shows a block diagram of a transmitter subsystem 300, which may be used to support SC-FDMA transmission on the uplink by a UE. Within transmitter subsystem 300, a transmit (TX) data processor 310 may receive data to transmit on the uplink, process (e.g., encode and symbol map) the data, and provide modulation symbols to a SC-FDMA modulator 320. Within SC-FDMA modulator 320, a discrete Fourier transform (DFT) unit 322 may perform an N-point DFT on N modulation symbols and provide N frequency-domain symbols, where N is the number of subcarriers assigned for transmission and may be an integer multiple of 12. A symbol-to-subcarrier mapper 324 may map the N frequency-domain symbols to N assigned subcarriers and may map zero symbols with a signal value of zero to the remaining subcarriers. An inverse fast Fourier transform (IFFT) unit 326 may perform a $N_{FFT}$-point IFFT on the mapped symbols for the $N_{FFT}$ total subcarriers and provide $N_{FFT}$ complex-valued time-domain output samples for a useful portion of a SC-FDMA symbol. A cyclic prefix generator 328 may copy the last $N_{CP}$ output samples of the useful portion and append these $N_{CP}$ output samples to the front of the useful portion to form a SC-FDMA symbol containing $N_{FFT}+N_{CP}$ output samples. The SC-FDMA symbol may be transmitted in one symbol period, which may include $N_{FFT}+N_{CP}$ sample periods. SC-FDMA modulator 320 may provide the output samples to a transmitter 330.

Within transmitter 330, a digital-to-analog converter (DAC) 332 may convert the output samples to analog baseband signals. The analog baseband signals may be filtered by a lowpass filter 334 to remove undesired images, amplified by an amplifier (AMP) 336, frequency upconverted from baseband to radio frequency (RF) by an upconverter 338, and further amplified by a power amplifier (PA) 340 to obtain an output RF signal. The output RF signal may be routed through a duplexer 350 and transmitted via an antenna 352. A phase-locked loop (PLL) 342 may receive an indication of a center frequency and may provide a control signal used to adjust the frequency of a local oscillator (LO) generator 344. LO generator 344 may generate inphase (I) and quadrature (Q) LO signals at the proper frequency for upconverter 338.

FIG. 3 shows an exemplary design of transmitter subsystem 300. Subsystem 300 as well as each module within subsystem 300 may also be implemented in other manners. For example, transmitter 330 may include different and/or additional circuit blocks in the signal path from DAC 332 to power amplifier 340.

Figure 4:
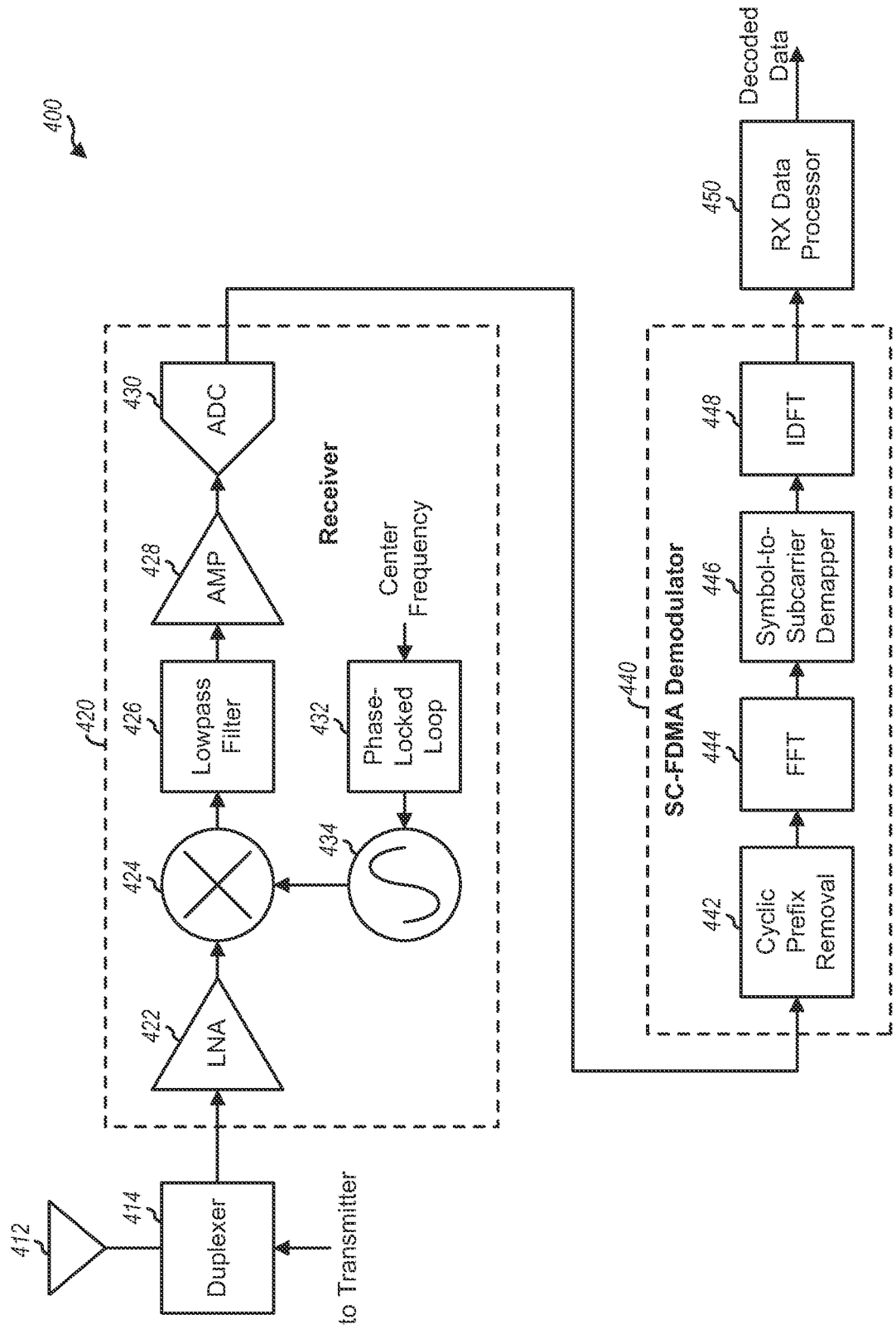
FIG. 4 shows a receiver subsystem for a SC-FDMA transmission.

FIG. 4 shows a block diagram of a receiver subsystem 400, which may be used to support reception of a SC-FDMA transmission on the uplink by an eNB. Within receiver subsystem 400, an antenna 412 may receive uplink signals transmitted by UEs and provide a received RF signal. The received RF signal may be routed through a duplexer 414 and provided to a receiver 420. Within receiver 420, the received RF signal may be amplified by a low noise amplifier (LNA) 422, frequency downconverted from RF to baseband by a downconverter 424, filtered by a lowpass filter 426, amplified by an amplifier 428, and digitized by an analog-to-digital converter (ADC) 430. ADC 430 may provide time-domain input samples to a SC-FDMA demodulator 440. A PLL 432 may receive an indication of a center frequency and may provide a control signal used to adjust the frequency of a LO generator 434. LO generator 434 may generate I and Q LO signals at the proper frequency for downconverter 424.

Within SC-FDMA demodulator 440, a cyclic prefix removal unit 442 may obtain $N_{FFT}+N_{CP}$ input samples in one symbol period, remove $N_{CP}$ input samples corresponding to the cyclic prefix, and provide $N_{FFT}$ input samples for the useful portion. A fast Fourier transform (FFT) unit 444 may perform a $N_{FFT}$-point FFT on the $N_{FFT}$ input samples and provide $N_{FFT}$ frequency-domain received symbols for the $N_{FFT}$ total subcarriers. A symbol-to-subcarrier demapper 446 may provide N received symbols for the N subcarriers used for data transmission and may discard the remaining received symbols. An inverse DFT (IDFT) unit 448 may perform a N-point IDFT on the N received symbols and provide N time-domain demodulated symbols. A receive (RX) data processor 450 may process (e.g., symbol demap and decode) the demodulated symbols and provide decoded data.

FIG. 4 shows an exemplary design of receiver subsystem 400. Subsystem 400 as well as each module within subsystem 400 may also be implemented in other manners. For example, receiver 420 may include different and/or additional circuit blocks in the signal path from LNA 422 to ADC 430.

The system may support machine-to-machine (M2M) communication by low cost, low data rate devices. These devices may be simplified UEs and may be referred to as M2M UEs. The M2M UEs may be used for various applications such as electric meters, vending machines, automated sensors, etc. The M2M UEs may have certain characteristics such as low cost, low complexity, low power consumption, low data rate, and delay insensitive data.

Transmitter subsystem 300 in FIG. 3 may be used for M2M UEs but may be much more complex than necessary to meet the data requirements of the M2M UEs. Transmitter subsystem 300 may thus result in higher cost and higher power consumption for the M2M UEs.

In an aspect, a low-complexity transmission scheme may be used to support communication by M2M UEs and may achieve some or all of the desired characteristics noted above. The low-complexity transmission scheme may allow a M2M UE to transmit on a single subcarrier (or a small number of subcarriers). This may then allow the M2M UE to omit a SC-FDMA modulator and to operate with a much simpler transmitter. In particular, the M2M UE may be implemented without the DFT, IFFT, and cyclic prefix generator in FIG. 3.

In one design, data may be sent on a single subcarrier by applying modulation directly to one or more LO signals. For binary phase shift keying (BPSK), modulation may be achieved by selectively inverting a single LO signal (e.g., with a single modulator) based on the modulation symbols being sent. For quadrature phase shift keying (QPSK), modulation may be achieved by (i) selectively inverting each of the I and Q LO signals (e.g., with two modulators) based on the modulation symbols being sent and (ii) overlapping and adding the modulated I and Q LO signals. In one design, two transition patterns may be stored for BPSK, and twelve transition patterns may be stored for QPSK. Each transition pattern may be used at the boundary of two consecutive modulation symbols corresponding to different constellation points. No transition pattern may be needed when the consecutive modulation symbols correspond to the same constellation point. The transition patterns may mitigate excessive emissions by eliminating abrupt changes that would otherwise lead to discontinuities in the transmitted signal.

Figure 5:
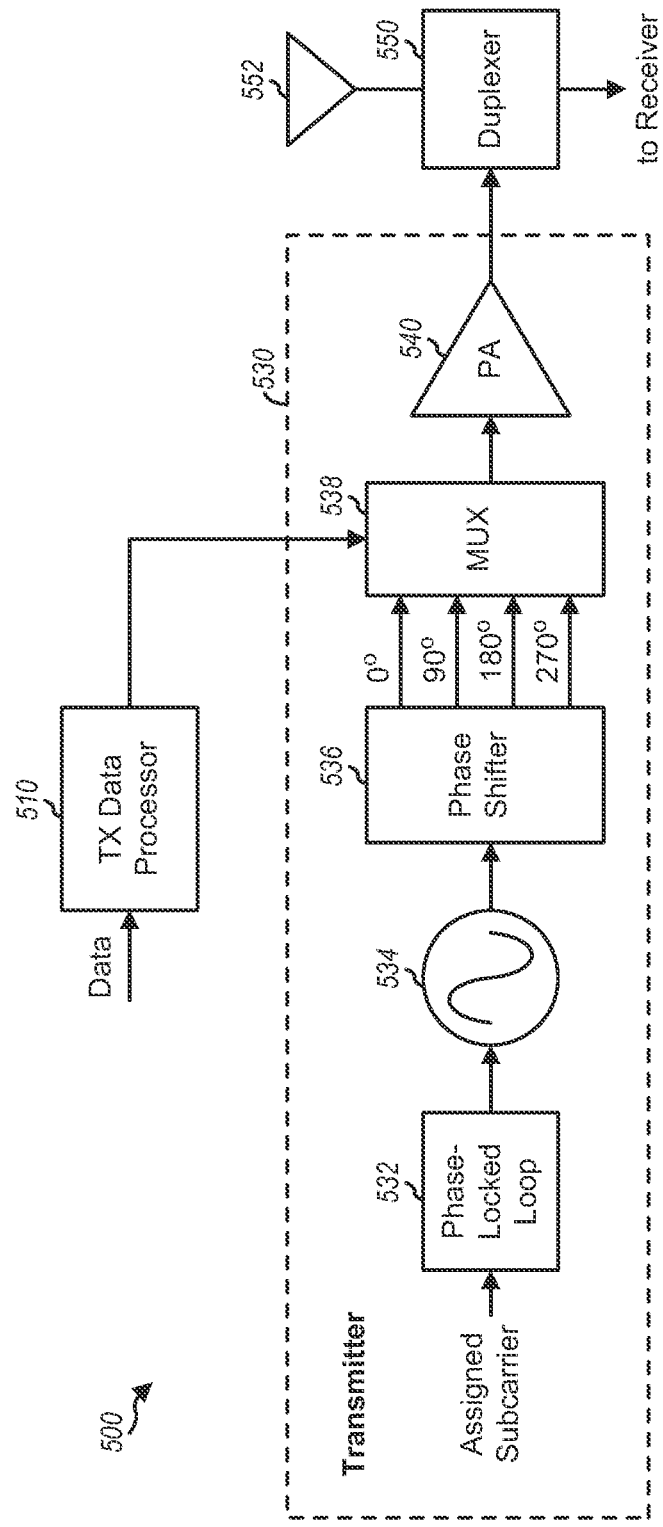
FIG. 5 shows a transmitter subsystem for a single-subcarrier transmission.

FIG. 5 shows a block diagram of a design of a transmitter subsystem 500, which supports the low-complexity transmission scheme and may be used for a M2M UE. Within transmitter subsystem 500, a TX data processor 510 may receive data to transmit on the uplink, process (e.g., encode and symbol map) the data, and provide modulation symbols to a transmitter 530.

Within transmitter 530, a PLL 532 may receive an indication of a subcarrier assigned to a M2M UE and may provide a control signal used to adjust the frequency of a LO generator 534. LO generator 534 may generate a LO signal at the proper frequency based on the control signal from PLL 532. A phase shifter 536 may receive the LO signal and provide four LO signals that are in quadrature and denoted as 0°, 90°, 180° and 270°. A multiplexer (MUX) 538 may receive the four LO signals from phase shifter 536 and may provide one of the four LO signals to a power amplifier 540 in each symbol period based on a modulation symbol being sent in that symbol period. Power amplifier 540 may amplify the LO signal from multiplexer 538 and provide an output RF signal. The output RF signal may be routed through a duplexer 550 and transmitted via an antenna 552.

FIG. 5 shows an exemplary design of transmitter subsystem 500, which can support BPSK and QPSK. Subsystem 500 and transmitter 530 may also be implemented in other manners. For example, to support only BPSK, phase shifter 536 may provide only the 0° and 180° LO signals. Transmitter 530 may also include different and/or additional circuit blocks in the signal path from PLL 532 to power amplifier 540. For example, a driver amplifier (DA) may be inserted between multiplexer 538 and power amplifier 540 and may be used to provide signal gain and/or the output RF signal.

Figure 6:
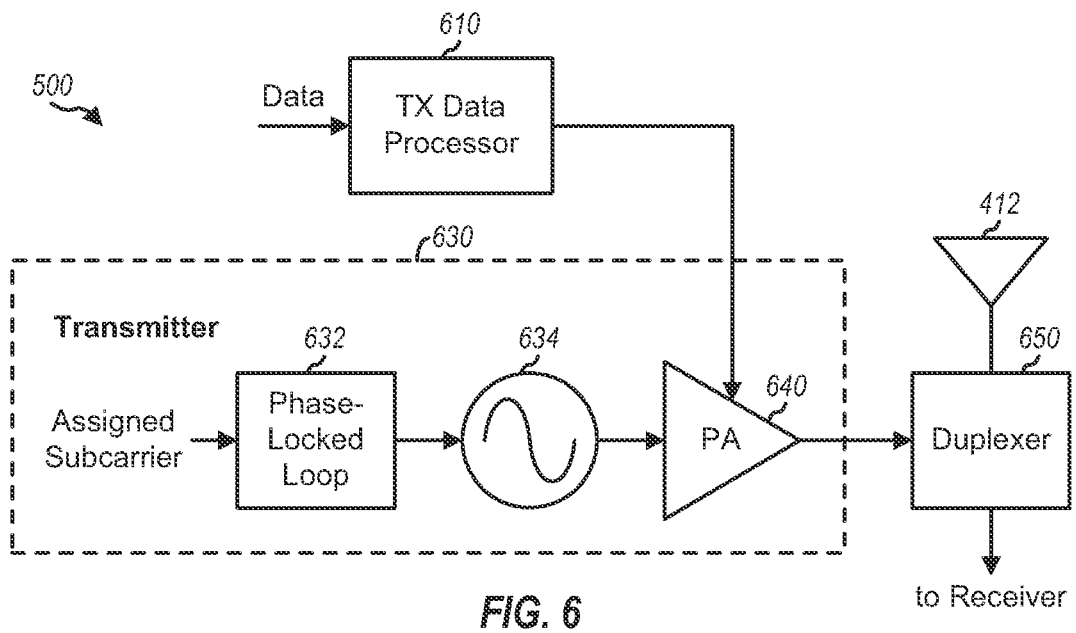
FIG. 6 shows another transmitter subsystem for a single-subcarrier transmission.

FIG. 6 shows a block diagram of a design of a transmitter subsystem 600, which also supports the low-complexity transmission scheme and may also be used for a M2M UE. Within transmitter subsystem 600, a TX data processor 610 may receive data to transmit on the uplink, process the data, and provide modulation symbols to a transmitter 630.

Within transmitter 630, a PLL 632 may receive an indication of a subcarrier assigned to a M2M UE and may provide a control signal used to adjust the frequency of a LO generator 634. LO generator 634 may generate a LO signal at the proper frequency based on the control signal from PLL 632. A power amplifier 640 may receive the LO signal from LO generator 634 and the modulation symbols from TX data processor 610. Power amplifier 640 may modulate the LO signal based on the modulation symbols and may further amplify the modulated LO signal to obtain an output RF signal. The output RF signal may be routed through a duplexer 650 and transmitted via an antenna 652.

FIG. 6 shows an exemplary design of transmitter subsystem 600. Subsystem 600 and transmitter 630 may also be implemented in other manners. Transmitter 630 may also include different and/or additional circuit blocks in the signal path from PLL 632 to power amplifier 640. For example, a driver amplifier may be inserted between LO generator 634 and power amplifier 640 and may be used to provide signal gain and/or the output RF signal.

FIGS. 5 and 6 show two exemplary designs of transmitter subsystems supporting the low-complexity transmission scheme. Other transmitter subsystems may also be used to support the low-complexity transmission scheme.

Power amplifier 540 in FIG. 5 and power amplifier 640 in FIG. 6 may be implemented with constant envelope amplifiers having good power added efficiency (PAE). For example, power amplifier 540 or 640 may be implemented with a power amplifier normally used in a GSM transmitter. A GSM power amplifier may be operated in saturation (or a non-linear region) to obtain better efficiency. The better efficiency may result in lower power consumption and longer battery life for a M2M UE. The output RF signal from the GSM power amplifier may resemble a square wave instead of a sinusoidal and may include a desired signal component at the center frequency as well as undesired signal components at harmonics of the center frequency. The undesired signal components may be easily filtered by duplexer 550 or 650 prior to transmission via antenna 552 or 652.

Power amplifiers in cellular/mobile devices and M2M devices may have strict size and cost constraints. It may be desirable to have a single power amplifier that can operate over a wide frequency range covering multiple frequency bands, so that a device would not need multiple power amplifiers to support multiple frequency bands. Unfortunately, designing multi-band power amplifiers with acceptable PAE is usually too challenging. Consequently, most devices incorporate dedicated power amplifiers for each supported frequency band, which increases cost and size. Any technique that can alleviate power efficiency limitations may enable designing multi-band power amplifiers and thereby alleviate the above-mentioned constraints.

Figure 7A:
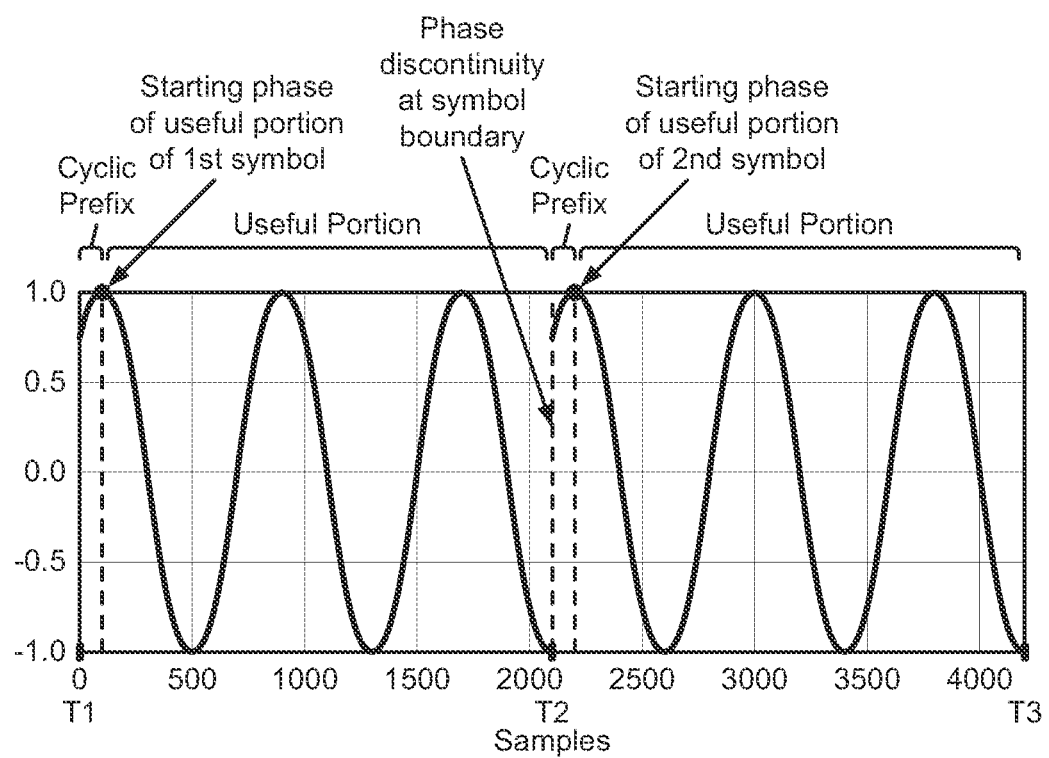
FIGS. 7A to 7C show plots of a single-subcarrier transmission.

FIG. 7A shows a plot of a transmission on a single subcarrier. The horizontal axis represents time and is given in units of samples. The vertical axis represents amplitude and is given in normalized units of +1 to −1. FIG. 7A shows an example in which a SC-FDMA symbol includes a useful portion of 2048 samples and a cyclic prefix of 128 samples.

FIG. 7A shows two SC-FDMA symbols carrying data on a single subcarrier. The first SC-FDMA symbol is from time T1 to time T2 and includes a cyclic prefix of 128 samples followed by a useful portion of 2048 samples. The second SC-FDMA symbol is from time T2 to time T3 and includes a cyclic prefix of 128 samples followed by a useful portion of 2048 samples. A sinusoidal signal for the single subcarrier may be generated such that it has a known phase at the start of the useful portion of each SC-FDMA symbol. For example, the sinusoidal signal may be generated such that it has (i) a phase of 0° and a magnitude of 1.0 at the start of the useful portion of the first SC-FDMA symbol and (ii) a phase of 0° and a magnitude of 1.0 at the start of the useful portion of the second SC-FDMA symbol, as shown in FIG. 7A. In this case, there may be discontinuity in the sinusoidal signal at the boundary between consecutive SC-FDMA symbols, e.g., at the boundary between the end of the first SC-FDMA symbol and the start of the second SC-FDMA symbol at time T2, as shown in FIG. 7A. It may be difficult to generate a sinusoidal signal with phase discontinuity at symbol boundary.

In one design, a transmitter subsystem may generate a continuous sinusoidal signal for a single subcarrier. This may result in the useful portions of different SC-FDMA symbols having different starting phases (e.g., instead of 0° phase). A receiver subsystem may account for the different starting phases of the useful portions of different SC-FDMA symbols.

Figure 7B:
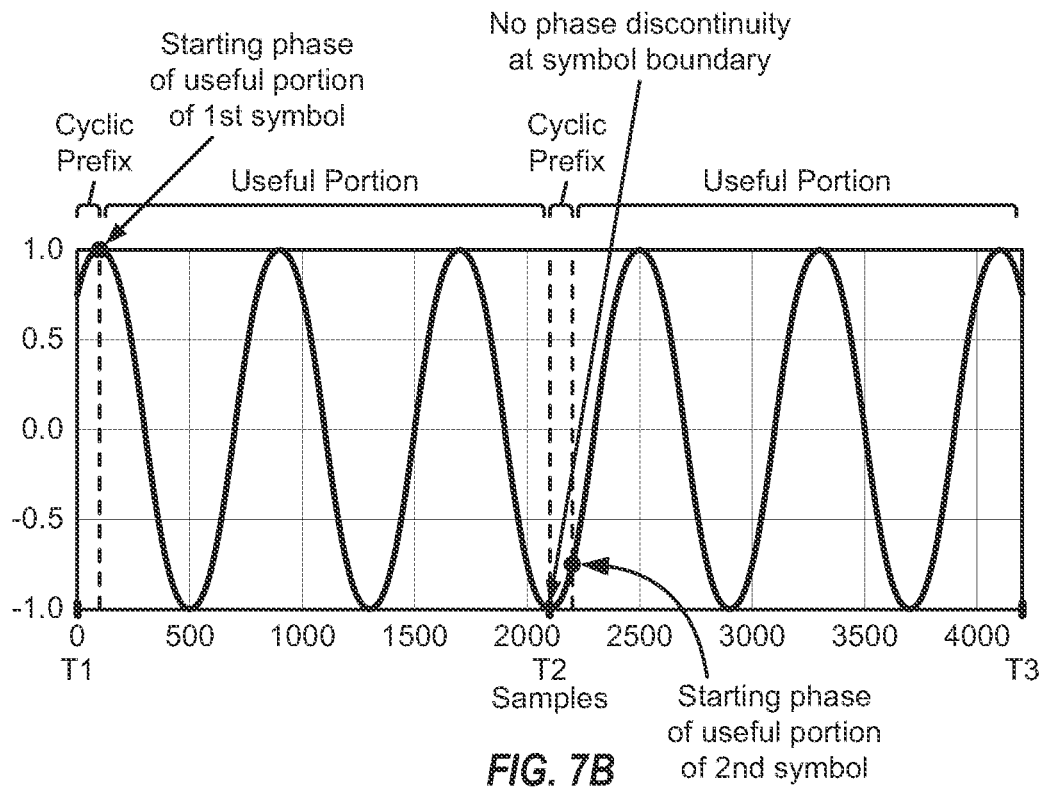

FIG. 7B shows a plot of a continuous sinusoidal signal for a single subcarrier without phase discontinuity between consecutive SC-FDMA symbols. FIG. 7B shows two SC-FDMA symbols with the same modulation. The first SC-FDMA symbol is from time T1 to time T2 and includes a cyclic prefix of 128 samples followed by a useful portion of 2048 samples. The second SC-FDMA symbol is from time T2 to time T3 and includes a cyclic prefix of 128 samples followed by a useful portion of 2048 samples. The useful portion of the first SC-FDMA symbol starts at a first phase, which is 0° in FIG. 7B.

The useful portion of the second SC-FDMA symbol starts at a second phase, which is different from the first phase. However, there is no phase discontinuity in the sinusoidal signal at the boundary between the first and second SC-FDMA symbols. Hence, the value at the end of the first SC-FDMA symbol at time T2 matches the value at the start of the second SC-FDMA symbol at time T2.

Figure 7C:
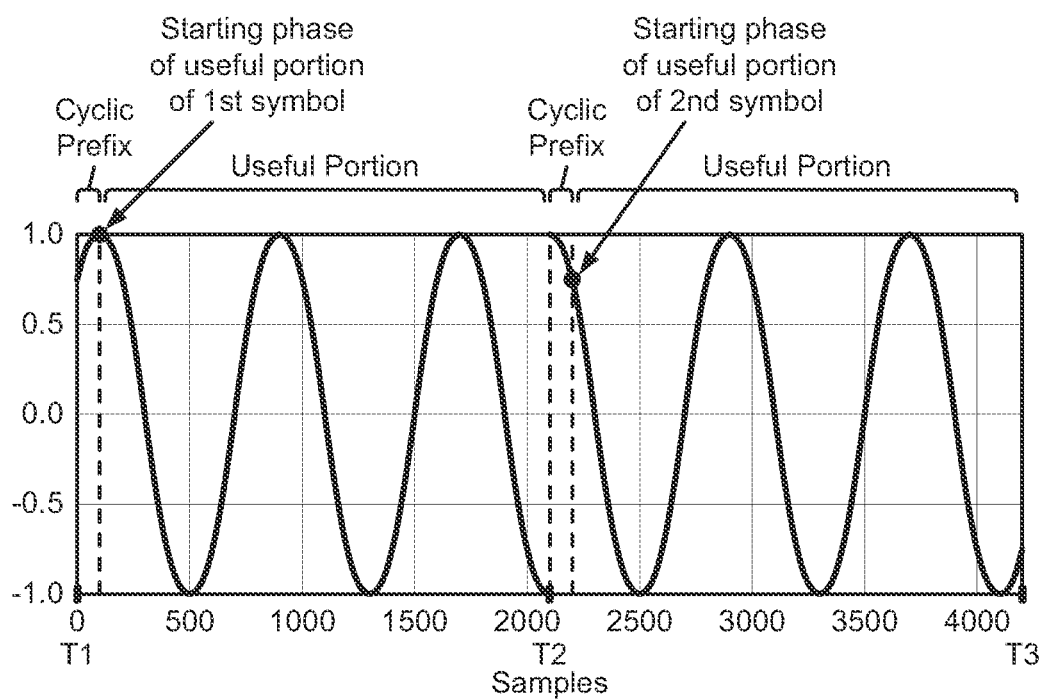

FIG. 7C shows a plot of a transmission on a single subcarrier without phase discontinuity between consecutive SC-FDMA symbols. A continuous sinusoidal signal for the single subcarrier may be generated as shown in FIG. 7B. Modulation may be applied to this sinusoidal signal by changing the phase of the sinusoidal signal at symbol boundary. In the example shown in FIG. 7C, a first modulation symbol is applied to the sinusoidal signal from time T1 to time T2 (e.g., by multiplying the sinusoidal signal with a value of +1.0). A second modulation symbol having an opposite value as that of the first modulation symbol is applied to the sinusoidal signal from time T2 to time T3 (e.g., by multiplying the sinusoidal signal with a value of −1.0). Modulation may be applied to the continuous sinusoidal signal based on the design shown in FIG. 5 or 6.

A receiver subsystem at an eNB may receive one or more single-subcarrier transmissions from one or more M2M UEs. The eNB may determine the phase at the start of the useful portion of each SC-FDMA symbol from each M2M UE based on the subcarrier assigned to that M2M UE. The eNB may account for the different starting phases for different SC-FDMA symbols from each M2M UE, as described below.

Air interface standards typically ensure that there is an integer number of cycles of a transmitted sinusoid signal within the useful portion of a SC-FDMA symbol or an OFDM symbol by specifying the subcarrier spacing to be equal to the inverse of the symbol length/period. For example, in LTE, the subcarrier spacing is 15 kHz, and the SC-FDMA symbol length is $\frac{1}{15}$kHz=66.67 microseconds (µs). However, in the LTE uplink, a half-tone offset is utilized, which results in a non-integer number of sinusoidal cycles within the useful portion of a SC-FDMA symbol. This is illustrated in FIGS. 7A, 7B and 7C. This feature is non-essential for the practice of generating a sinusoidal signal. Whether there is an integer number of cycles of the transmitted sinusoid signal within the useful portion of the SC-FDMA symbol may also depend on the assumed placement of the LO frequency. In any case, with the subcarrier spacing specified as the inverse of the SC-FDMA symbol length, the difference in the number of sinusoidal cycles within the useful portion of the SC-FDMA symbol may always be an integer when comparing any two subcarriers.

Figure 8A:
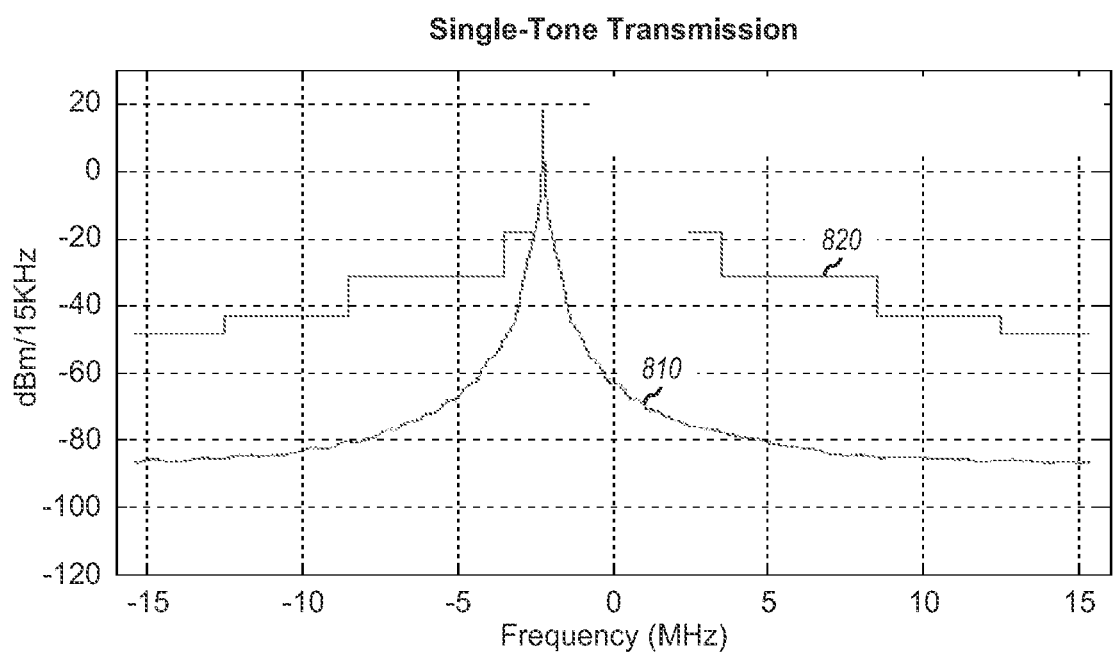
FIG. 8A shows a spectral response of a single-subcarrier transmission.

FIG. 8A shows a plot 810 of a spectral response of a transmission on a single subcarrier. The horizontal axis represents frequency and is given in units of 5 MHz. The vertical axis represents amplitude and is given in units of dBm per 15 KHz. A plot 820 shows a spectral mask, which specifies the maximum allowed emission from a UE at different frequencies away from the center frequency. Plot 810 shows a spectral response of a transmission on a single subcarrier located near a lower edge of a 5 MHz system bandwidth. As shown in FIG. 8A, the spectral response includes a large amount of energy on the single subcarrier and progressively less energy further away from this subcarrier. The spectral response may also include undesired signal components at odd harmonics of the center frequency (not shown in FIG. 8A). These undesired signal components are relatively far away in frequency and may be easily filtered. Furthermore, the spectral response does not include LO leakage or I/Q crosstalk, since single side band (SSB) modulation is not performed. The relatively clean spectral response of the single-subcarrier transmission may simplify filtering.

Figure 8B:
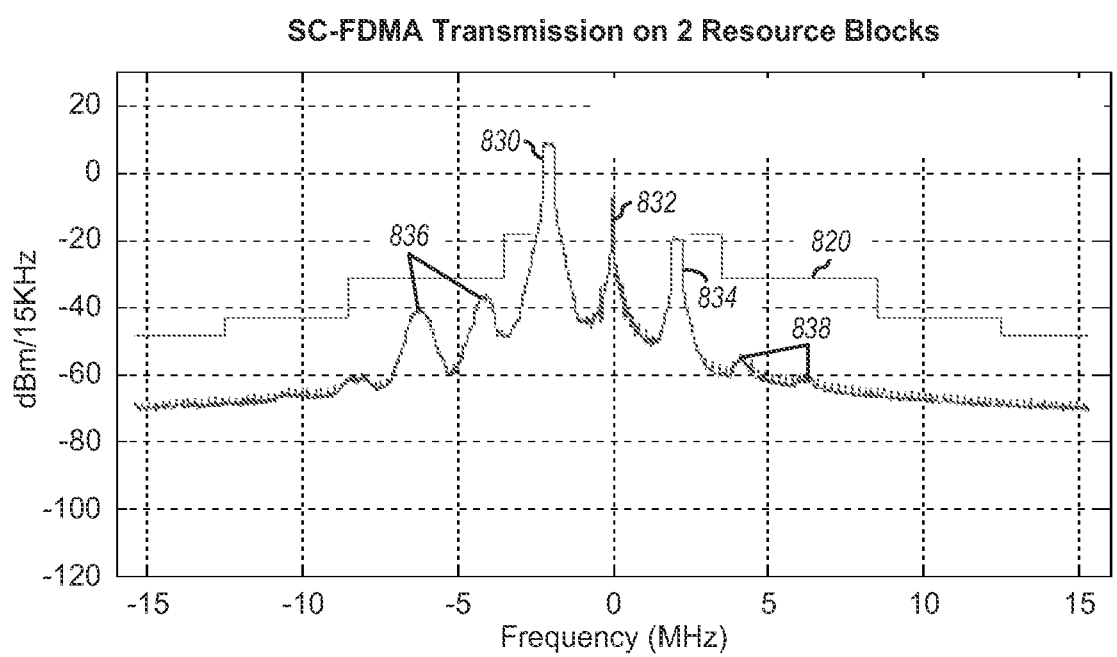
FIG. 8B shows a spectral response of a SC-FDMA transmission.

FIG. 8B shows a plot 830 of a spectral response of a SC-FDMA transmission on 24 subcarriers in two resource blocks. As shown in FIG. 8B, the spectral response includes a large amount of energy on the 24 subcarriers in the two resource blocks. The spectral response also includes a relatively large peak 832 at the center frequency due to LO leakage. The spectral response also includes a relatively large image 834 due to I/Q crosstalk caused by mismatch of the gain and/or phase of a pair of I and Q mixers used for quadrature upconversion. The spectral response also includes other images 836 and 838 caused by mixing between various desired and undesired signal components. The undesired signal components may require additional filtering at a UE and may be avoided by transmitting on a single subcarrier, as shown in FIG. 8A.

A M2M UE may transmit data on a single subcarrier assigned to the UE. The M2M UE may also transmit a reference signal that may be used by an eNB for coherent demodulation/detection of the data sent by the UE. The M2M UE may transmit data and reference signal in various manners.

Figure 9A:
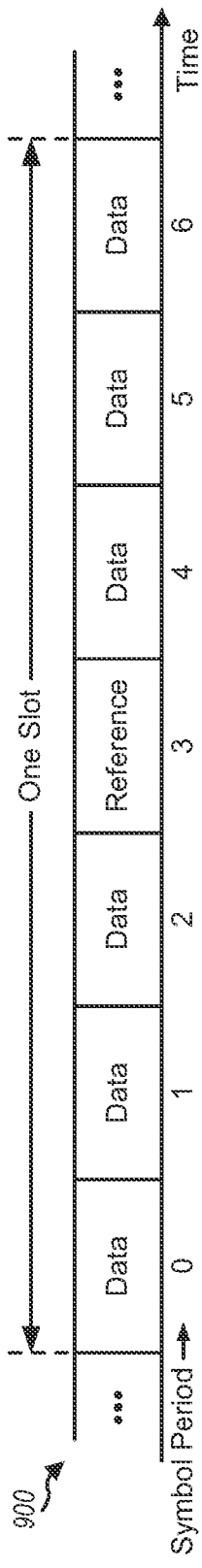
FIGS. 9A and 9B show two slot formats for a single-subcarrier transmission.

FIG. 9A shows a design of a transmission format 900 for a single-subcarrier transmission. FIG. 9A shows the case in which a slot includes seven symbol periods with indices of 0 through 6 for the normal cyclic prefix. In the design shown in FIG. 9A, a reference symbol may be transmitted in the middle symbol period 3, and six data modulation symbols may be transmitted in the remaining six symbol periods. A reference symbol is a modulation symbol that is known a priori by a transmitter and a receiver.

Figure 9B:
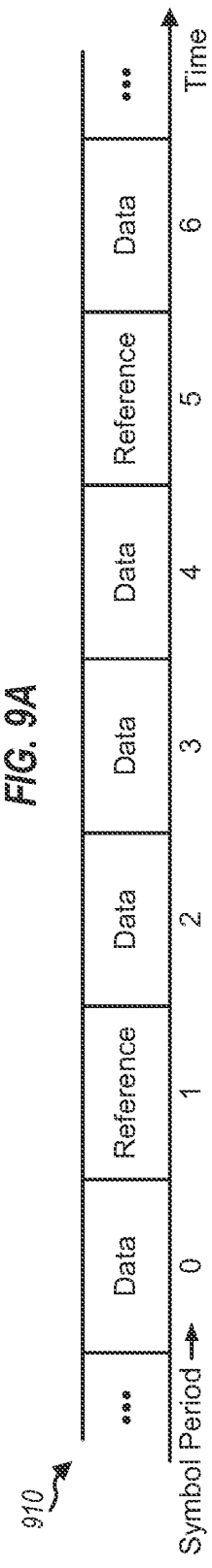

FIG. 9B shows a design of a transmission format 910 for a single-subcarrier transmission. In the design shown in FIG. 9B, two reference symbols may be transmitted in two symbol periods 1 and 5, and five data modulation symbols may be transmitted in the remaining five symbol periods.

FIGS. 9A and 9B show two designs of transmitting data and reference signal on a single subcarrier. In general, reference symbols may be transmitted in any number of symbol periods and in any one of the symbol periods available for transmission. For example, reference symbols may be transmitted in every Q-th symbol period, where Q may be any integer value, e.g., Q=7 for a normal cyclic prefix as shown in FIG. 9A or Q=6 for an extended cyclic prefix. More reference symbols may improve channel estimation at the expense of higher overhead.

Figure 10:
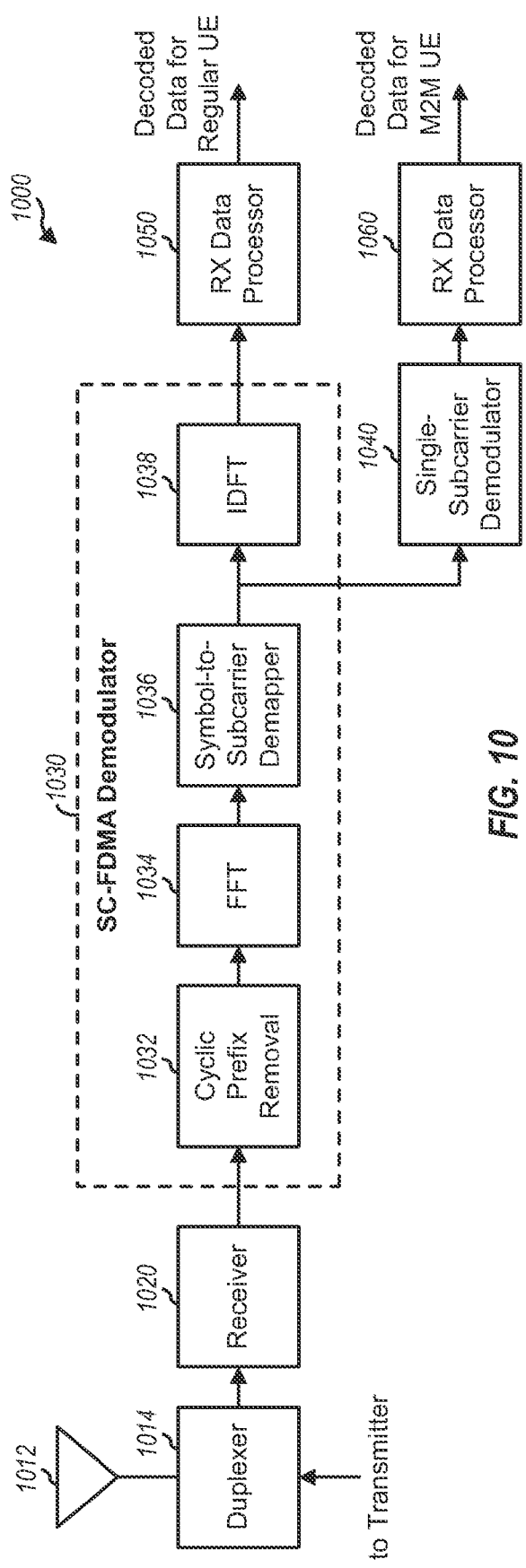
FIG. 10 shows a receiver subsystem for a single-subcarrier transmission.

FIG. 10 shows a block diagram of a design of a receiver subsystem 1000, which supports the low-complexity transmission scheme and may be used for an eNB. Within receiver subsystem 1000, an antenna 1012 may receive uplink signals transmitted by regular UEs and M2M UEs and provide a received RF signal. The received RF signal may be routed through a duplexer 1014 and processed by a receiver 1020 to obtain input samples.

Within a SC-FDMA demodulator 1030, a cyclic prefix removal unit 1032 may obtain $N_{FFT}+N_{CP}$ input samples in each symbol period, remove $N_{CL}$ input samples corresponding to the cyclic prefix, and provide $N_{FFT}$ input samples for the useful portion. A FFT unit 1034 may perform a $N_{FFT}$-point FFT on the $N_{FFT}$ time-domain input samples in each symbol period and provide $N_{FFT}$ frequency-domain received symbols for the $N_{FFT}$ total subcarriers. A symbol-to-subcarrier demapper 1036 may provide received symbols for a set of subcarriers assigned to a regular UE to an IDFT unit 1038. Demapper 1036 may also provide received symbols for a subcarrier assigned to a M2M UE to a single-subcarrier demodulator 1040. IDFT unit 1038 may perform an IDFT on the received symbols for the regular UE in each symbol period and provide demodulated symbols. A RX data processor 1050 may process (e.g., symbol demap and decode) the demodulated symbols for the regular UE and provide decoded data for the regular UE.

Single-subcarrier demodulator 1040 may perform phase correction and coherent demodulation for the M2M UE. Demodulator 1040 may perform phase correction to account for phase discontinuity at symbol boundary and coherent demodulation based on a channel estimate in either the time domain or the frequency domain. Demodulator 1040 may process the received symbols from the subcarrier assigned to the M2M UE and provide demodulated symbols, as described below. A RX data processor 1060 may process the demodulated symbols and provide decoded data for the M2M UE.

FIG. 11 shows a block diagram of a design of a single-subcarrier demodulator 1040x, which performs phase correction and coherent demodulation in the time domain. Within demodulator 1040x, a demultiplexer (Demux) 1112 may obtain a received symbol from a subcarrier assigned to a M2M UE in each symbol period, provide received symbols obtained in symbol periods used for data transmission to a buffer 1114, and provide received symbols obtained in symbol periods used for a reference signal to a channel estimator 1122. Channel estimator 1122 may derive a channel estimate for a wireless channel for the M2M UE based on the received symbols for the reference signal. Buffer 1114 may provide one received symbol at a time for demodulation when the channel estimate is available. A single-subcarrier converter 1116 may obtain a received symbol for each symbol period 1116 and provide a sinusoidal signal at the amplitude and phase determined by the received symbol. A phase correction unit 1118 may receive the sinusoidal signal for each symbol period from converter 1116 and may adjust the phase of the sinusoidal signal to account for phase discontinuity at symbol boundary due to the M2M UE generating a continuous sinusoidal signal across symbol periods. For example, unit 1118 may rotate a sinusoidal signal received from converter 1116 in a given symbol period by an amount corresponding to the starting phase of the sinusoidal signal as generated at the M2M UE. A coherent demodulator (Demod) 1120 may receive the corrected sinusoidal signal for each symbol period from unit 1118 and the channel estimate from channel estimator 1122. Demodulator 1120 may perform coherent demodulation on the corrected sinusoidal signal for each symbol period based on the channel estimate and provide a demodulated symbol, which may be an estimate of a modulation symbol sent by the M2M UE.

FIG. 11 shows an exemplary design of performing phase correction and coherent demodulation in the time domain. Phase correction and coherent demodulation may also be performed in the frequency domain. For example, the received symbol for each symbol period may be rotated by an amount corresponding to the starting phase of the sinusoidal signal for that symbol period as generated at the M2M UE. Coherent demodulation may then be performed on the rotated symbols in the frequency domain based on the channel estimate.

In one design, twelve M2M channels may be defined for twelve subcarriers in one resource block, one M2M channel for each subcarrier. In general, any number of M2M channels may be defined based on any number of resource blocks. The resource blocks used for the M2M channels may be located within the control region or the data region.

In one design, a M2M UE may be assigned a M2M channel for use to transmit data on the uplink. The M2M UE may be assigned the M2M channel symmetrically. For example, the M2M UE may be assigned a first subcarrier in a first slot of a subframe and a second subcarrier in a second slot of the subframe, and the second subcarrier may be symmetrically opposite around a center frequency relative to the first subcarrier. Frequency hopping implemented in this manner may increase frequency diversity, which may improve link performance in frequency selective fading channels.

In one design, a M2M channel may be mapped to a specific subcarrier without frequency hopping. This design may simplify the operation of a transmitter subsystem at a M2M UE since a LO generator can be maintained at a fixed frequency corresponding to the assigned subcarrier. In another design, a M2M channel may be mapped to different subcarriers in different time intervals with frequency hopping. Each time interval may correspond to a symbol period, or a slot, or a subframe, or some other unit of time. This design may provide frequency diversity. A M2M UE may operate with discontinuous transmission (DTX) and may not transmit on the uplink when switching subcarrier for frequency hopping.

In one design, different sets of M2M channels may be reserved for different functions. For example, one set of M2M channels may be reserved for data transmission on the uplink. Another set of one or more M2M channels may be reserved for a random access channel (RACH) to allow M2M UEs to transmit access requests and/or other information on the uplink. A set of one or more M2M channels may be reserved for sending control information on the uplink. The control information may comprise acknowledgement (ACK) information for data transmission on the downlink, channel quality indicator (CQI) information, etc. Alternatively, control information may be multiplexed with data and sent on the same M2M channel. A set of one or more M2M channels may be reserved for sending a sounding reference signal (SRS) on the uplink. A M2M UE may be assigned one or more M2M channels for one or more functions. The M2M UE may transmit on each assigned M2M channel in a manner specified for that M2M channel.

In one design, a M2M channel may support a data rate of 24 kbps with QPSK modulation for the normal cyclic prefix. An information bit rate of 6 kbps may be supported on the M2M channel with an effective code rate of $R=\frac{1}{4}$ for channel encoding. Other data rates and information bit rates may also be supported on a M2M channel with other modulation schemes and/or other effective code rates.

M2M UEs may be multiplexed with regular UEs in a given subframe. In particular, a M2M UE may send an uplink transmission on a subcarrier for a M2M channel assigned to the M2M UE in the subframe. A regular UE may send an uplink transmission on one or more resource blocks assigned to the regular UE in the subframe. The low-complexity transmission scheme may thus be backward compatibility with SC-FDMA transmission. An eNB may receive single-subcarrier transmissions from one or more M2M UEs as well as SC-FDMA transmissions from one or more regular UEs. Demapper 1036 in FIG. 10 may provide (i) received symbols for a subcarrier assigned to each M2M UE to single-subcarrier demodulator 1040 and (ii) received symbols for subcarriers assigned to each regular UE to IDFT unit 1038.

For clarity, transmission on a single subcarrier has been described above. Transmission on multiple subcarriers may also be possible. In one design, multiple instances of the circuitry that can generate a single-subcarrier signal may be used for multiple subcarriers, and the individual single-subcarrier signals for the multiple subcarriers may be summed to obtain an output signal. This design may be especially applicable for a small number of subcarriers. The use of multiple subcarriers simultaneously may increase complexity and result in a higher peak-to-average-power ratio (PAPR) as compared to the use of a single subcarrier. Hence, it may be desirable to use a single subcarrier if the required data rate can be supported.

The complexity and cost of a transmitter subsystem for a M2M UE may be reduced with the low-cost transmission scheme described above. The complexity and cost of the transmitter subsystem may also be reduced in other manners.

In one design, a driver amplifier may be used instead of a power amplifier in a transmitter for a M2M UE. The driver amplifier may be able to provide an output RF signal at a power level of 0 to 4 dBm, which may be sufficient for some applications. Omitting the power amplifier from the transmitter may reduce cost and size. The reduced size may be due to removal of the power amplifier as well as reduced thermal constraint without the power amplifier.

In another design, a power amplifier may be bypassed and turned off when not needed. A driver amplifier may be able to provide the desired output power at a certain power level or below. Thus, when the desired output power is sufficiently low, the driver amplifier may provide the output RF signal, and the power amplifier may be turned off to save power consumption.

A power amplifier may be selected or bypassed based on various considerations such as power consumption, time diversity, etc. Assuming operation in a linear region, a M2M UE may transmit twice as long and at half the output power level in order to deliver the same amount of data. Transmitting over a longer time duration may improve time diversity and may also be beneficial when the M2M UE is power-limited. However, transmitting over a longer time duration may increase wake-up time for the M2M UE to receive ACK information for the uplink transmission. If the bulk of the power consumption is due to the power amplifier, then it may not matter whether the M2M UE transmits at a nominal power level for a nominal duration or twice as long at half the power level. However, if there is an overhead due to other circuit blocks within the M2M UE, then power consumption may be reduced by transmitting at a higher power level for a shorter duration, subject to other considerations such as staying within a linear SNR region, preserving a HARQ gain, etc. Thus, using the power amplifier may improve battery life for the M2M UE.

In one design, a transmit filter after a power amplifier or a driver amplifier in a transmitter may be omitted. The transmit filter may filter an output RF signal from the power amplifier or driver amplifier and provide a filtered RF signal to an antenna. Removing the transmit filter may reduce insertion loss and improve link budget by about 1 to 2 dB, which may be desirable. However, several issues would need to be addressed before the transmit filter can be removed. First, for coexistence between a transmitter and a receiver, undesired signal components in the output RF signal should be sufficiently low (e.g., lower than −50 dBm per MHz) in all receive frequency bands of a M2M UE in order to minimally impact performance of downlink transmission to the M2M UE. If the bandwidth of uplink transmission is limited to a few resource blocks (e.g., to one subcarrier), then coexistence may be met without any transmit filter. Second, for self-desense, the undesired signal components should be sufficiently low (e.g., lower than −110 dBm per MHz) in all receive frequency bands so that the M2M UE can reliably receive downlink transmission at the lowest possible received power level. The power amplifier may be designed to meet this requirement. Alternatively, the M2M UE may operate in a half-duplex mode in which the UE may transmit on the uplink in some time intervals and receive on the downlink in some other time intervals (e.g., via scheduling). Third, for spurious suppression, undesired signal component at harmonics of the center frequency may be attenuated by a sufficient amount (e.g., by −30 dBm/MHz for third harmonic). Some relaxed transmit filtering may be sufficient to achieve this function.

In one design, a receive filter between an antenna and a receiver may be omitted. The receive filter may filter a received RF signal from an antenna and provide a filtered RF signal to the receiver. Blocking requirements may be relaxed to allow for removal of the receive filter. Blocking requirements are typically defined in minimum performance standards and specify expected demodulation performance when a weak desired signal is received in the presence of a strong undesired signal on another frequency. Different power offsets between the desired and undesired signals are specified for different amount of separation in frequency. In addition, the power offset is larger when the undesired signal is outside of the operating band of the desired signal as compared to the case when it is within the operating band.

In one design, a duplexer may be omitted. The duplexer may include a transmit filter and a receive filter. The duplexer may be removed if the issues regarding removal of the transmit filter and the receive filter can be satisfactorily addressed.

The complexity and cost of a transmitter subsystem for a M2M UE may also be reduced in other manners. The complexity and cost of a receiver subsystem for the M2M UE may also be reduced.

In one design, a convolutional code instead of a Turbo code may be used for channel encoding for data transmission on the downlink to a M2M UE. A decoder for a convolutional code may be simpler than a decoder for a Turbo code.

In another design, a M2M UE may operate in a PDCCH-less mode in which the UE may be assigned certain resources with a semi-persistent downlink grant. Data may then be sent to the M2M UE based on the assigned resources, without having to send a downlink grant on a Physical Downlink Control Channel (PDCCH) with each downlink data transmission. In yet another design, system information blocks (SIBs) and data may be transmitted to a M2M UE in the center 1.08 MHz of the system bandwidth instead of across the entire system bandwidth. This design may enable the M2M UE to receive all pertinent downlink transmissions with a 1.08 MHz receiver.

FIG. 12 shows a design of a process 1200 for transmitting data in a wireless communication system. Process 1200 may be performed by a first UE (as described below) or by some other entity. The first UE may generate a first transmission for a single subcarrier assigned to the first UE (block 1212). The first UE may send the first transmission on the single subcarrier concurrently (e.g., in the same symbol period, or slot, or subframe) with a SC-FDMA transmission sent on multiple subcarriers by a second UE (block 1214). The single subcarrier and the multiple subcarriers may be among a plurality of subcarriers within the system bandwidth.

In one design of block 1212, the first UE may generate a continuous sinusoidal signal at a frequency corresponding to the single subcarrier assigned to the first UE. The first UE may then modulate the continuous sinusoidal signal with at least one modulation symbol, e.g., for data, control information, etc. In one design, the first UE may generate a plurality of sinusoidal signals of different phases based on the continuous sinusoidal signal, e.g., as shown in FIG. 5. The first UE may then provide one of the plurality of sinusoidal signals in each symbol period based on a modulation symbol to send in that symbol period. In another design, the first UE may amplify the continuous sinusoidal signal with an amplifier, which may be a power amplifier, e.g., as shown in FIG. 6. The first UE may vary the amplitude of the amplifier based on the at least one modulation symbol. The first UE may also generate the first transmission in other manners.

The first UE may also modulate the continuous sinusoidal signal with at least one reference symbol. In one design, a reference symbol may be transmitted in a center symbol period of a time interval (e.g., a slot), and at least one modulation symbol for data may be transmitted in at least one symbol period on each side of the reference symbol in the time interval, e.g., as shown in FIG. 9A. Reference symbols may also be transmitted in other manners.

In one design, the first UE may generate the first transmission comprising a continuous sinusoidal signal modulated with a plurality of modulation symbols in a plurality of symbol periods. The first transmission may comprise a cyclic prefix followed by a useful portion in each symbol period, e.g., as shown in FIGS. 7A to 7C. The useful portions in the plurality of symbol periods may have different starting phases, e.g., as shown in FIG. 7B.

In one design, the first UE may receive an assignment of a M2M channel mapped to the single subcarrier assigned to the first UE. The M2M channel may be one of a plurality of M2M channels mapped to a plurality of subcarriers for a resource block. The multiple subcarriers used by the second UE to send the SC-FDMA transmission may be for at least one other resource block. In one design, the first UE may send an access request on a M2M channel reserved for sending access requests. In one design, the first UE may send a SRS on a M2M channel used for sending the SRS. The first UE may also send other transmissions on the same M2M channel used to send the first transmission or on a different M2M channel.

In one design, a power amplifier may be bypassed if not needed to reduce power consumption. The first UE may amplify the first transmission with a power amplifier if an output power level above a threshold (e.g., +4 dBm) is selected. The power amplifier may be bypassed if an output power level below the threshold is selected.

In one design, a transmit filter may be omitted at the first UE. The first UE may amplify the first transmission with an amplifier (e.g., a power amplifier or a driver amplifier). The amplified first transmission may be passed from the amplifier directly to an antenna without passing through a transmit filter or a duplexer.

FIG. 13 shows a design of a process 1300 for receiving data in a wireless communication system. Process 1300 may be performed by a base station/eNB (as described below) or by some other entity. The base station may process a received signal to obtain (i) a first transmission sent on a single subcarrier by a first UE and (ii) a SC-FDMA transmission sent on multiple subcarriers by a second UE (block 1312). The first transmission and the SC-FDMA transmission may be sent in the same symbol period, or slot, or subframe. The base station may perform demodulation for the first transmission to recover data sent on the single subcarrier by the first UE (block 1314). The base station may also perform demodulation for the SC-FDMA transmission to recover data sent on the multiple subcarriers by the second UE (block 1316).

In one design of block 1312, the base station may remove a cyclic prefix in the received signal for each symbol period. The base station may transform the received signal to the frequency domain, after removal of the cyclic prefix, to obtain received symbols for a plurality of subcarriers. The base station may then provide (i) received symbols from the single subcarrier used to send the first transmission by the first UE and (ii) received symbols from the multiple subcarriers used to send the SC-FDMA transmission by the second UE.

In one design, the base station may perform phase correction to account for phase discontinuity at symbol boundary due to (i) the first UE generating a continuous sinusoidal signal for the first transmission and (ii) the first transmission comprising a useful portion and a cyclic prefix in each of a plurality of symbol periods. To perform phase correction, the base station may determine a starting phase for the useful portion in each symbol period based on the frequency of the single subcarrier, the cyclic prefix length, and the symbol period duration. The base station may perform phase correction for each symbol period based on the starting phase for the useful portion in that symbol period.

In one design of block 1314, the base station may derive a channel estimate based on at least one reference symbol sent in the first transmission by the first UE. The base station may then perform coherent demodulation for at least one received symbol from the single subcarrier based on the channel estimate to obtain at least one demodulated symbol. The base station may perform coherent demodulation for the at least one received symbol in the time domain (e.g., as shown in FIG. 11) or in the frequency domain.

In one design, the base station may assign the first UE with a M2M channel mapped to the single subcarrier. The M2M channel may be one of a plurality of M2M channels mapped to a plurality of subcarriers for a resource block. The multiple subcarriers used by the second UE to send the SC-FDMA transmission may be for at least one other resource block.

In one design, the base station may receive an access request sent by the first UE on a M2M channel reserved for sending access requests. In one design, the base station may receive a SRS sent by the first UE on a M2M channel used for sending the SRS. The base station may also receive other transmissions sent by the first UE on one or more other M2M channels.

Figure 14:
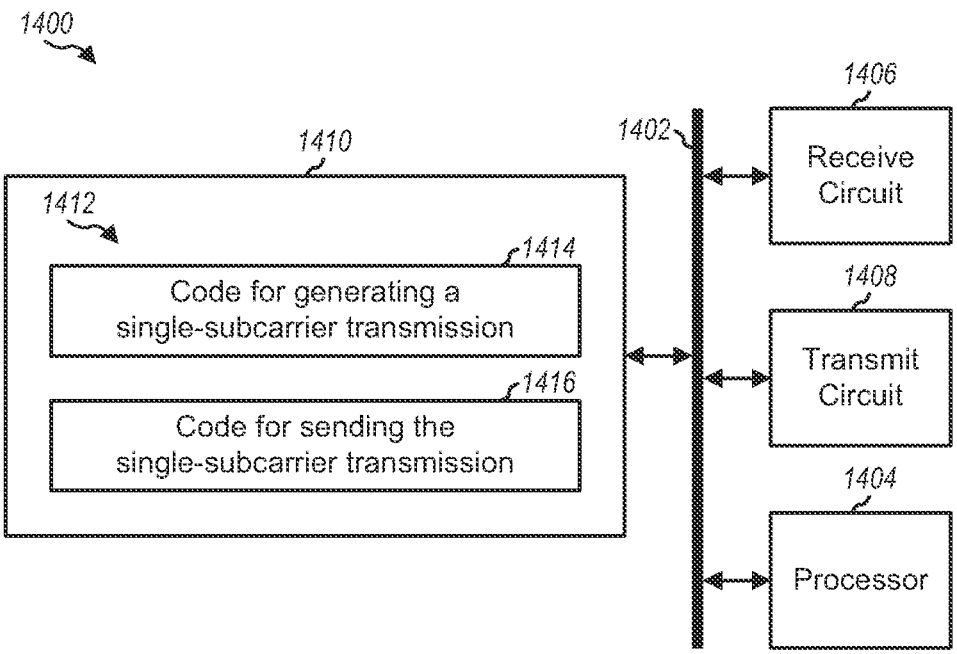
FIG. 14 shows an apparatus for transmitting data.

FIG. 14 shows part of a hardware implementation of an apparatus 1400 that is configured to transmit data in a wireless communication system. Apparatus 1400 includes circuitry and may be one configuration of a UE. In this specification and the appended claims, the term "circuitry" is construed as a structural term and not as a functional term. For example, circuitry may be an aggregate of circuit components, such as a multiplicity of integrated circuit components, in the form of processing and/or memory cells, units, blocks and the like, such as shown and described in FIG. 14.

Apparatus 1400 comprises a central data bus 1402 linking several circuits together. The circuits include a processor 1404, a receive circuit 1406, a transmit circuit 1408, and a memory 1410. Memory 1410 is in electronic communication with processor 1404, so that processor 1404 may read information from and/or write information to memory 1410. Processor 1404 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor 1404 may include a combination of processing devices, e.g., a combination of a DSP and a microprocessor, a plurality of microprocessors, one or more microprocessors in conjunction with a DSP core, or any other such configuration.

Receive circuit 1406 and transmit circuit 1408 may be connected to a radio frequency (RF) circuit (not shown in FIG. 14). Receive circuit 1406 may process and buffer received signals before sending the signals out to data bus 1402. Transmit circuit 1408 may process and buffer data from data bus 1402 before sending the data out of apparatus 1400. Processor 1404 may perform the function of data management of data bus 1402 and further the function of general data processing, including executing the instructional contents of memory 1410. Transmit circuit 1408 and receive circuit 1406 may be external to processor 1404 (as shown in FIG. 14) or may be part of processor 1404.

Memory 1410 stores a set of instructions 1412 executable by processor 1404 to implement the methods described herein. Instructions 1412 may include code 1414 for generating a first transmission for a single subcarrier assigned to a first UE and code 1416 to send the first transmission on the single subcarrier assigned to the first UE. The first transmission may be sent concurrently with a SC-FDMA transmission sent on multiple subcarriers by a second UE.

Instructions 1412 shown in memory 1410 may comprise any type of computer-readable statement(s). For example, instructions 1412 in memory 1410 may refer to one or more programs, routines, sub-routines, modules, functions, procedures, data sets, etc. Instructions 1412 may comprise a single computer-readable statement or many computer-readable statements.

Memory 1410 may be a RAM (Random Access Memory) circuit. Memory 1410 may be tied to another memory circuit (not shown) which may either be of a volatile or a nonvolatile type. As an alternative, memory 1410 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 1410 may be considered to be an example of a computer-program product that comprises a computer-readable medium with instructions 1412 stored therein.

Figure 15:
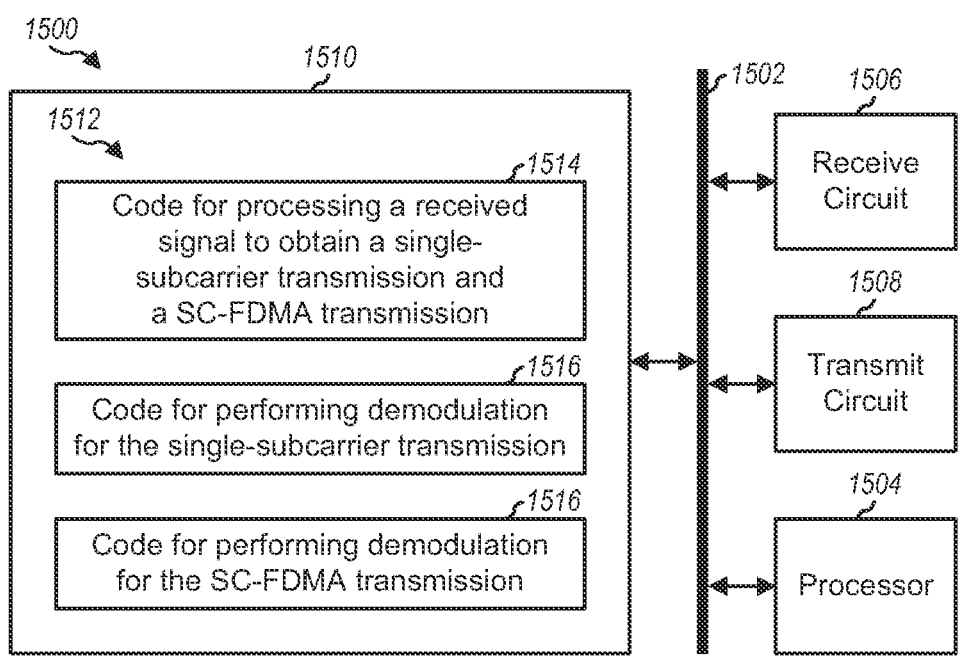
FIG. 15 shows an apparatus for receiving data.

FIG. 15 shows part of a hardware implementation of an apparatus 1500 that is configured to receive data in a wireless communication system. Apparatus 1500 includes circuitry and may be one configuration of a base station/eNB. Apparatus 1500 comprises a central data bus 1502, a processor 1504, a receive circuit 1506, a transmit circuit 1508, and a memory 1510, which may be implemented and operated in similar manners as central data bus 1402, processor 1404, receive circuit 1406, transmit circuit 1408, and memory 1410 in FIG. 14.

Memory 1510 includes a set of instructions 1512 executable by processor 1504 to implement the methods described herein. Instructions 1512 may include code 1514 for processing a received signal to obtain a first transmission sent on a single subcarrier by a first UE and a SC-FDMA transmission sent on multiple subcarriers by a second UE. Instructions 1512 may also include code 1516 for performing demodulation for the first transmission to recover data sent on the single subcarrier by the first UE. Instructions 1512 may further include code 1516 for performing demodulation for the SC-FDMA transmission to recover data sent on the multiple subcarriers by the second UE.

Figure 16:
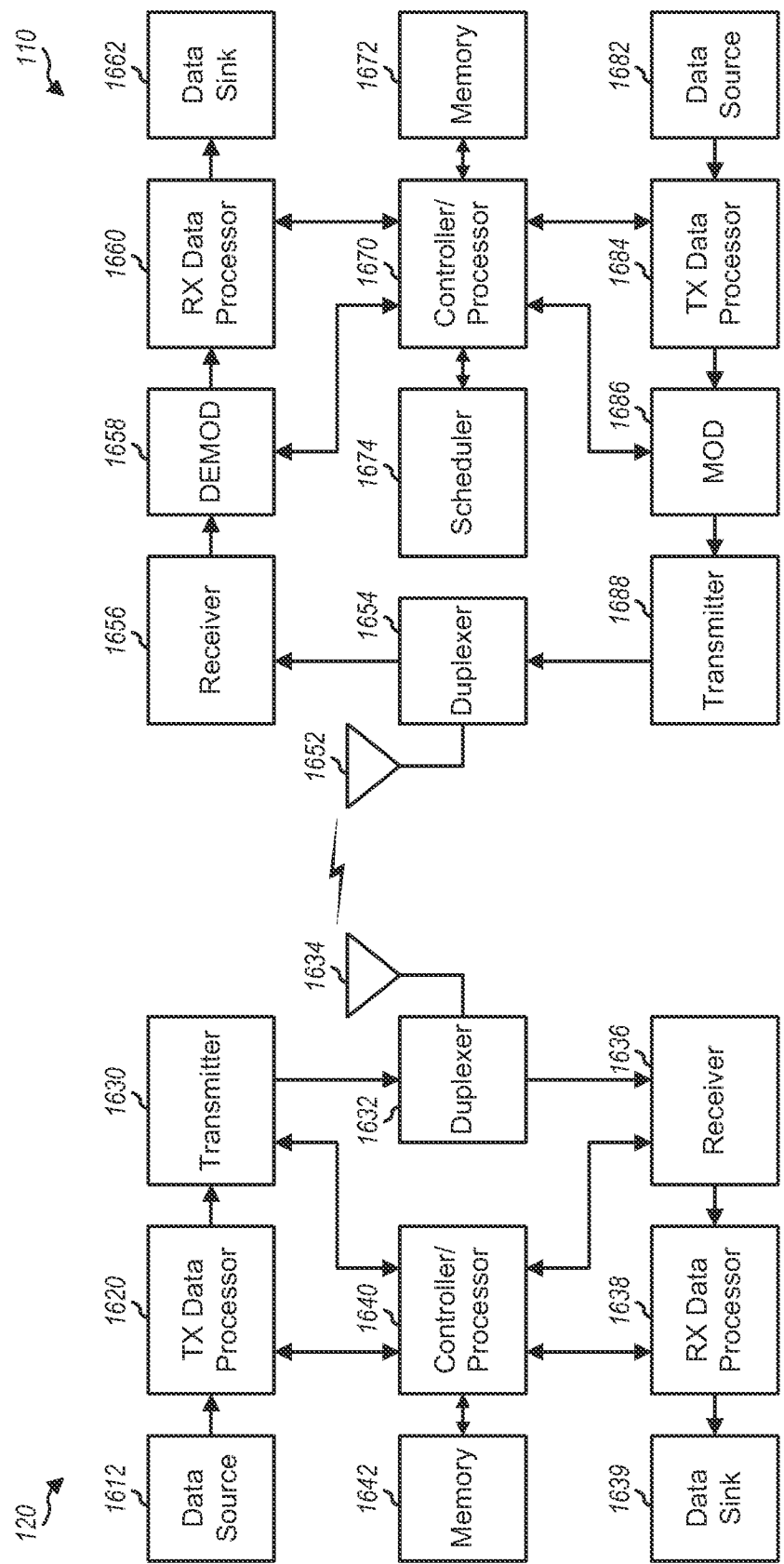
FIG. 16 shows a block diagram of a base station and a UE.

FIG. 16 shows a block diagram of a design of a base station/eNB 110 and a UE 120, which may be one of the base stations/eNBs and one of the UEs in FIG. 1. At UE 120, a TX data processor 1620 may receive data from a data source 1612, process (e.g., encode and modulate) the data based on one or more modulation and coding schemes selected for UE 120, and provide data symbols, which are modulation symbols for data. Processor 1620 may also process control information and provide control symbols, which are modulation symbols for control information. The control information may comprise ACK information, CQI information, etc. Processor 1620 may also generate reference symbols for one or more reference signals (e.g., SRS). Processor 1620 may multiplex the data symbols, the control symbols, and the reference symbols. A transmitter 1630 may process the multiplexed symbols and generate an output RF signal, which may be routed through a duplexer 1632 and transmitted via an antenna 1634.

At base station 110, an antenna 1652 may receive the uplink signals from UE 120 and other UEs and may provide a received RF signal, which may be routed through a duplexer 1654 and provided to a receiver 1656. Receiver 1656 may condition (e.g., filter, amplify, downconvert, and digitize) the received RF signal and provide input samples. A demodulator (DEMOD) 1658 may process the input samples (e.g., for SC-FDMA, coherent demodulation, etc.) to obtain demodulated symbols. A RX data processor 1660 may process (e.g., symbol demap and decode) the demodulated symbols to obtain decoded data and control information sent by UE 120. Processor 1660 may provide the decoded data to a data sink 1662 and the decoded control information to a controller/processor 1670.

On the downlink, at base station 110, data from a data source 1682 and control information (e.g., grants, ACK information, etc.) from controller/processor 1670 may be processed by a TX data processor 1684, modulated by a modulator (MOD) 1686, conditioned by a transmitter 1688, routed through duplexer 1654, and transmitted via antenna 1652. At UE 120, the downlink signal from base station 110 may be received by antenna 1634, routed through duplexer 1632, conditioned by a receiver 1636, and processed by a RX data processor 1638 to recover the data and control information sent by base station 110 to UE 120. Processor 1638 may provide the recovered data to a data sink 1639 and the recovered control information to controller/processor 1640.

Controllers/processors 1640 and 1670 may direct the operation at UE 120 and base station 110, respectively. Transmitter 1630 may be implemented with transmitter 530 in FIG. 5, or transmitter 630 in FIG. 6, or some other low-complexity transmitter. Demodulator 1658 may be implemented with SC-FDMA demodulator 1030 and single-subcarrier demodulator 1040 in FIGS. 10 and 11. Processor 1640 and/or other processors and modules at UE 120 may perform or direct process 1200 in FIG. 12 and/or other processes for the techniques described herein. Processor 1670 and/or other processors and modules at base station 110 may perform or direct process 1300 in FIG. 13 and/or other processes for the techniques described herein. Memories 1642 and 1672 may store data and program codes for UE 120 and base station 110, respectively. A scheduler 1674 may schedule UE 120 and/or other UEs for data transmission on the downlink and/or uplink.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication between a network entity and a plurality of user equipment, wherein the network entity communicates with the plurality of user equipment on a plurality of subcarriers, the method comprising:
   generating a first transmission for a single subcarrier from the plurality of subcarriers, the single subcarrier being assigned to a first user equipment from the plurality of user equipment, wherein generating the first transmission further comprises generating a continuous sinusoidal signal at a frequency corresponding to the single subcarrier assigned to the first user equipment, and modulating the continuous sinusoidal signal with at least one modulation symbol; and
   sending the first transmission on the single subcarrier by the first user equipment, the first transmission being sent concurrently with a single-carrier frequency division multiple access (SC-FDMA) transmission sent by a second user equipment from the plurality of user equipment, the SC-FDMA transmission sent on multiple subcarriers from the plurality of subcarriers, the multiple subcarriers being different from the single subcarrier and assigned to the second user equipment.

2. The method of claim 1, wherein modulating the continuous sinusoidal signal comprises: generating a plurality of sinusoidal signals of different phases based on the continuous sinusoidal signal, and providing one of the plurality of sinusoidal signals in each symbol period based on one of the at least one modulation symbol.

3. The method of claim 1, wherein modulating the continuous sinusoidal signal comprises: amplifying the continuous sinusoidal signal with an amplifier, and varying an amplitude of the amplifier based on the at least one modulation symbol.

4. The method of claim 1, wherein modulating the continuous sinusoidal signal further comprises modulating the continuous sinusoidal signal with at least one reference symbol.

5. The method of claim 4, wherein a reference symbol is transmitted in a center symbol period of a time interval, and wherein at least one modulation symbol for data is transmitted in at least one symbol period on each side of the reference symbol in the time interval.

6. The method of claim 1, wherein the generating the first transmission comprises generating a continuous sinusoidal signal modulated with a plurality of modulation symbols in a plurality of symbol periods, the first transmission comprising a cyclic prefix followed by a useful portion in each symbol period, the useful portions in the plurality of symbol periods having different starting phases.

7. The method of claim 1, further comprising:
receiving an assignment of a machine-to-machine channel mapped to the single subcarrier assigned to the first user equipment.

8. The method of claim 7, wherein the machine-to-machine channel is one of a plurality of machine-to-machine channels mapped to subcarriers for a resource block, and wherein the multiple subcarriers used by the second user equipment to send the single-carrier frequency division multiple access transmission are for at least one other resource block.

9. The method of claim 7, further comprising:
sending an access request on a second machine-to-machine channel reserved for sending access requests.

10. The method of claim 7, further comprising:
sending a sounding reference signal on a second machine-to-machine channel used for sending the sounding reference signal.

11. The method of claim 1, further comprising:
amplifying the first transmission with a power amplifier if an output power level above a threshold is selected; and
bypassing the power amplifier if the output power level below the threshold is selected.

12. The method of claim 1, further comprising:
amplifying the first transmission with an amplifier; and
passing the amplified first transmission from the amplifier directly to an antenna without passing through a transmit filter or a duplexer.

13. An apparatus for wireless communication between a network entity and a plurality of user equipment wherein the network entity communicates with the plurality of user equipment on a plurality of subcarriers, the apparatus comprising:
means for generating a first transmission for a single subcarrier from the plurality of subcarriers, the single subcarrier being assigned to a first user equipment from the plurality of user equipment, wherein the means for generating the first transmission further comprises means for generating a continuous sinusoidal signal at a frequency corresponding to the single subcarrier assigned to the first user equipment, and means for modulating the continuous sinusoidal signal with at least one modulation symbol; and
means for sending the first transmission on the single subcarrier by the first user equipment, the first transmission being sent concurrently with a single-carrier frequency division multiple access (SC-FDMA) transmission sent by a second user equipment from the plurality of user equipment, the SC-FDMA transmission sent on multiple subcarriers from the plurality of subcarriers, the multiple subcarriers being different from the single subcarrier and assigned to the second user equipment.

14. The apparatus of claim 13, wherein the means for generating the first transmission comprises means for generating a continuous sinusoidal signal modulated with a plurality of modulation symbols in a plurality of symbol periods, the first transmission comprising a cyclic prefix followed by a useful portion in each symbol period, the useful portions in the plurality of symbol periods having different starting phases.

15. The apparatus of claim 13, further comprising:
means for receiving an assignment of a machine-to-machine channel mapped to the single subcarrier assigned to the first user equipment, the machine-to-machine channel being one of a plurality of machine-to-machine channels mapped to subcarriers for a resource block.

16. An apparatus for wireless communication between a network entity and a plurality of user equipment, wherein the network entity communicates with the plurality of user equipment on a plurality of subcarriers, the apparatus comprising:
circuitry configured to:
generate a first transmission for a single subcarrier from the plurality of subcarriers, the single subcarrier being assigned to a first user equipment from the plurality of user equipment, wherein the circuitry is further configured to generate a continuous sinusoidal signal at a frequency corresponding to the single subcarrier assigned to the first user equipment, and to modulate the continuous sinusoidal signal with at least one modulation symbol, and
send the first transmission on the single subcarrier by the first user equipment, the first transmission being sent concurrently with a single-carrier frequency division multiple access (SC-FDMA) transmission sent by a second user equipment from the plurality of user equipment, the SC-FDMA transmission sent on multiple subcarriers from the plurality of subcarriers, the multiple subcarriers being different from the single subcarrier and assigned to the second user equipment.

17. The apparatus of claim 16, wherein the circuitry is further configured to generate the first transmission comprising a continuous sinusoidal signal modulated with a plurality of modulation symbols in a plurality of symbol periods, the first transmission comprising a cyclic prefix followed by a useful portion in each symbol period, the useful portions in the plurality of symbol periods having different starting phases.

18. The apparatus of claim 16, wherein the circuitry is further configured to receive an assignment of a machine-to-machine channel mapped to the single subcarrier assigned to the first user equipment, the machine-to-machine channel being one of a plurality of machine-to-machine channels mapped to subcarriers for a resource block.

19. A non-transitory computer-readable medium for wireless communication between a network entity and a plurality of user equipment, wherein the network entity communicates with the plurality of user equipment on a plurality of subcarriers, the non-transitory computer-readable medium comprising:
code for causing at least one computer to generate a first transmission for a single subcarrier from the plurality of subcarriers, the single subcarrier being assigned to a first user equipment from the plurality of user equipment, wherein the code is further configured to generate a continuous sinusoidal signal at a frequency corresponding to the single subcarrier assigned to the first user equipment, and to modulate the continuous sinusoidal signal with at least one modulation symbol, and
code for causing the at least one computer to send the first transmission on the single subcarrier by the first user equipment, the first transmission being sent concurrently with a single-carrier frequency division multiple access (SC-FDMA) transmission sent by a second user equipment from the plurality of user equipment, the SC-FDMA transmission sent on multiple subcarriers from the plurality of subcarriers, the multiple subcarriers being different from the single subcarrier and assigned to the second user equipment.

20. A method for wireless communication between a network entity and a plurality of user equipment, wherein the network entity communicates with the plurality of user equipment on a plurality of subcarriers, the method comprising:
processing a received signal to obtain a first transmission sent on a single subcarrier from the plurality of subcarriers, the first transmission sent by a first user equipment from the plurality of user equipment and to obtain a single-carrier frequency division multiple access (SC-FDMA) transmission sent on multiple subcarriers from the plurality of subcarriers, the multiple subcarriers being different from the single subcarrier, the SC-FDMA transmission sent by a second user equipment from the plurality of user equipment; and
performing demodulation for the first transmission to recover data sent on the single subcarrier by the first user equipment, wherein performing demodulation for the first transmission further comprises deriving a channel estimate based on at least one reference symbol sent in the first transmission by the first user equipment, and performing coherent demodulation for at least one received symbol from the single subcarrier based on the channel estimate to obtain at least one demodulated symbol.

21. The method of claim 20, wherein processing the received signal comprises:
removing a cyclic prefix in the received signal for each symbol period,
transforming the received signal to frequency domain, after removal of the cyclic prefix, to obtain received symbols for subcarriers of the plurality of subcarriers, and
providing received symbols from the single subcarrier used to send the first transmission by the first user equipment.

22. The method of claim 20, wherein performing demodulation for the first transmission comprises performing phase correction to account for phase discontinuity at symbol boundary due to the first user equipment generating a continuous sinusoidal signal for the first transmission and the first transmission comprising a useful portion and a cyclic prefix in each of a plurality of symbol periods.

23. The method of claim 22, wherein performing phase correction comprises:
determining a starting phase for the useful portion in each of the plurality of symbol periods based on frequency of the single subcarrier, a cyclic prefix length, and a symbol period duration, and
performing phase correction for each of the plurality of symbol periods based on the starting phase for the useful portion in the symbol period.

24. The method of claim 20, wherein performing coherent demodulation comprises performing coherent demodulation for the at least one received symbol in time domain.

25. The method of claim 20, further comprising:
assigning the first user equipment with a machine-to-machine channel mapped to the single subcarrier.

26. The method of claim 25, wherein the machine-to-machine channel is one of a plurality of machine-to-machine channels mapped to subcarriers for a resource block, and wherein the multiple subcarriers used by the second user equipment to send the single-carrier frequency division multiple access transmission are for at least one other resource block.

27. The method of claim 25, further comprising:
receiving an access request sent by the first user equipment on a second machine-to-machine channel reserved for sending access requests.

28. The method of claim 25, further comprising:
receiving a sounding reference signal sent by the first user equipment on a second machine-to-machine channel used for sending the sounding reference signal.

29. An apparatus for wireless communication between a network entity and a plurality of user equipment, wherein the network entity communicates with the plurality of user equipment on a plurality of subcarriers, the apparatus comprising:
means for processing a received signal to obtain a first transmission sent on a single subcarrier from the plurality of subcarriers, the first transmission sent by a first user equipment and to obtain a single-carrier frequency division multiple access (SC-FDMA) transmission sent on multiple subcarriers from the plurality of subcarriers, the multiple subcarriers being different from the single subcarrier, the SC-FDMA transmission sent by a second user equipment from the plurality of user equipment; and
means for performing demodulation for the first transmission to recover data sent on the single subcarrier by the first user equipment, wherein the means for performing demodulation for the first transmission further comprises means for deriving a channel estimate based on at least one reference symbol sent in the first transmission by the first user equipment, and means for performing coherent demodulation for at least one received symbol from the single subcarrier based on the channel estimate to obtain at least one demodulated symbol.

30. The apparatus of claim 29, wherein the means for processing the received signal comprises:
means for removing a cyclic prefix in the received signal for each symbol period,
means for transforming the received signal to frequency domain, after removal of the cyclic prefix, to obtain received symbols for subcarriers of the plurality of subcarriers, and
means for providing received symbols from the single subcarrier used to send the first transmission by the first user equipment.

31. The apparatus of claim 29, wherein the means for performing demodulation for the first transmission comprises means for performing phase correction to account for phase discontinuity at symbol boundary due to the first user equipment generating a continuous sinusoidal signal for the first transmission and the first transmission comprising a useful portion and a cyclic prefix in each of a plurality of symbol periods.

32. The apparatus of claim 29, further comprising:
means for assigning the first user equipment with a machine-to-machine channel mapped to the single subcarrier, the machine-to-machine channel being one of a plurality of machine-to-machine channels mapped to subcarriers for a resource block.

33. An apparatus for wireless communication between a network entity and a plurality of user equipment, wherein the network entity communicates with the plurality of user equipment on a plurality of subcarriers, the apparatus comprising:
circuitry configured to:
process a received signal to obtain a first transmission sent on a single subcarrier from the plurality of subcarriers, the first transmission sent by a first user equipment, and to obtain a single-carrier frequency division multiple access (SC-FDMA) transmission sent on multiple subcarriers from the plurality of subcarriers, the multiple subcarriers being different from the single subcarrier, the SC-FDMA transmission sent by a second user equipment from the plurality of user equipment, and perform demodulation for the first transmission to recover data sent on the single subcarrier by the first user equipment, wherein the circuitry is further configured to derive a channel estimate based on at least one reference symbol sent in the first transmission by the first user equipment, and to perform coherent demodulation for at least one received symbol from the single subcarrier based on the channel estimate to obtain at least one demodulated symbol.

34. The apparatus of claim 33, wherein the circuitry is further configured to remove a cyclic prefix in the received signal for each symbol period, to transform the received signal to frequency domain, after removal of the cyclic prefix, to obtain received symbols for subcarriers of the plurality of subcarriers, and to provide received symbols from the single subcarrier used to send the first transmission by the first user equipment.

35. The apparatus of claim 33, wherein the circuitry is further configured to perform phase correction to account for phase discontinuity at symbol boundary due to the first user equipment generating a continuous sinusoidal signal for the first transmission and the first transmission comprising a useful portion and a cyclic prefix in each of a plurality of symbol periods.

36. The apparatus of claim 33, wherein the circuitry is further configured to assign the first user equipment with a machine-to-machine channel mapped to the single subcarrier, the machine-to-machine channel being one of a plurality of machine-to-machine channels mapped to subcarriers for a resource block.

37. A non-transitory computer-readable medium for wireless communication between a network entity and a plurality of user equipment, wherein the network entity communicates with the plurality of user equipment on a plurality of subcarriers, the non-transitory computer-readable medium comprising:

code for causing at least one computer to process a received signal to obtain a first transmission sent on a single subcarrier from the plurality of subcarriers, the first transmission sent by a first user equipment from the plurality of user equipment and to obtain a single-carrier frequency division multiple access (SC-FDMA) transmission sent on multiple subcarriers from the plurality of subcarriers, the multiple subcarriers being different from the single subcarrier, the SC-FDMA transmission sent by a second user equipment from the plurality of user equipment, and code for causing the at least one computer to perform demodulation for the first transmission to recover data sent on the single subcarrier by the first user equipment, wherein the code for causing the at least one computer to perform demodulation for the first transmission further comprises to derive a channel estimate based on at least one reference symbol sent in the first transmission by the first user equipment, and to perform coherent demodulation for at least one received symbol from the single subcarrier based on the channel estimate to obtain at least one demodulated symbol.

* * * * *